United States Patent [19]

Ryoichi et al.

[11] Patent Number: 4,868,862
[45] Date of Patent: Sep. 19, 1989

[54] AUTOMOBILE TELEPHONE UNIT

[75] Inventors: Kimura Ryoichi; Hattori Noriaki, both of Saitama; Watabe Kazuharu, Tokyo, all of Japan

[73] Assignee: Honda Giken Kogyo Kabushiki Kaisha, Tokyo, Japan

[21] Appl. No.: 276,454

[22] Filed: Nov. 10, 1988

[30] Foreign Application Priority Data

Mar. 30, 1987 [JP] Japan .................................. 62-48119

[51] Int. Cl.⁴ ............................................. H01Q 7/04
[52] U.S. Cl. ...................................... 379/58; 455/90; 379/438
[58] Field of Search ................... 379/58, 63, 438, 419, 379/481; 455/90

[56] References Cited

U.S. PATENT DOCUMENTS

| | | | |
|---|---|---|---|
| 1,690,634 | 11/1928 | Green | 379/438 |
| 2,678,779 | 5/1954 | Bellmer | 379/438 |
| 3,483,898 | 12/1969 | Tini | 379/438 |
| 3,953,688 | 4/1976 | Rocha | 379/438 |
| 4,590,337 | 5/1986 | Englemore | 379/438 |
| 4,646,987 | 3/1987 | Peterson | 242/107.11 |
| 4,694,486 | 9/1987 | Yuter | 379/110 |
| 4,727,569 | 2/1988 | Kutrieb et al. | 379/58 |

*Primary Examiner*—Robert Lev
*Attorney, Agent, or Firm*—Lahive & Cockfield

[57] ABSTRACT

An automobile telephone unit (T) has a main body (11) located in a prescribed position in the cabin of an automobile, a telephone number dialing device (D) electrically connected to the main body (11), and a handset (12) electrically connected to the main body (11) through a connector cord (2) and supportable on the main body (11) when not in use. A takeup mechanism having a reel (R) for winding the connector cord (20) is disposed in the main body (12). A switch mechanism (23, 24) coacting with the takeup mechanism is disposed in the main body (12) for energizing the telephone unit (T) when the connector cord (T) is unreeled a predetermined length from the reel (R) and for de-energizing the telephone unit (T) when the connector cord (20) is rewound on a predetermined length on the reel (R). Even if the automobile is vibrated when it is running on a rough road, the telephone unit (T) is not energized unless the connector cord (20) is unreeled the predetermined length from the reel (R).

17 Claims, 26 Drawing Sheets

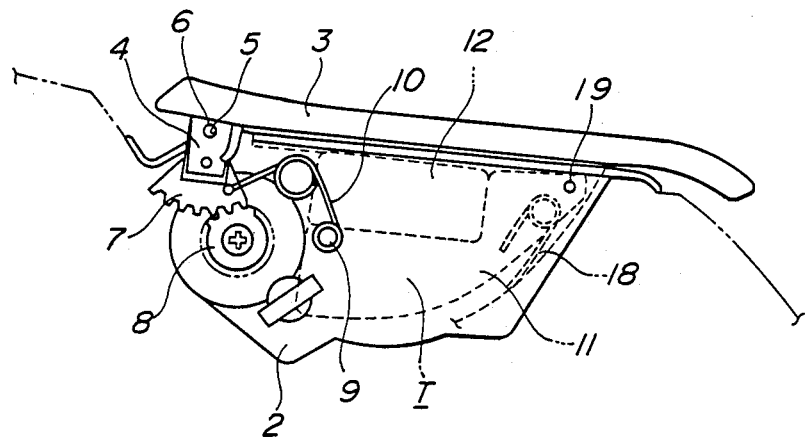
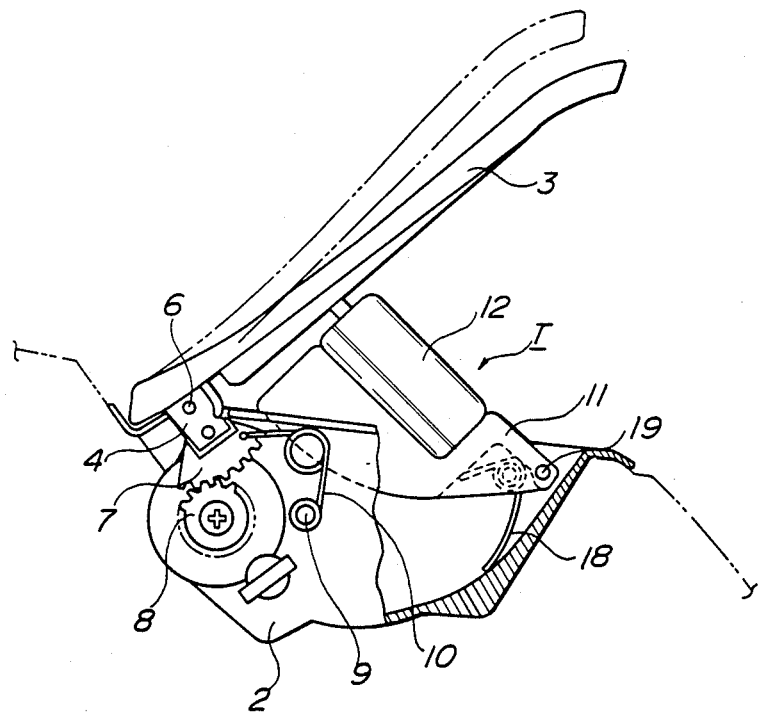

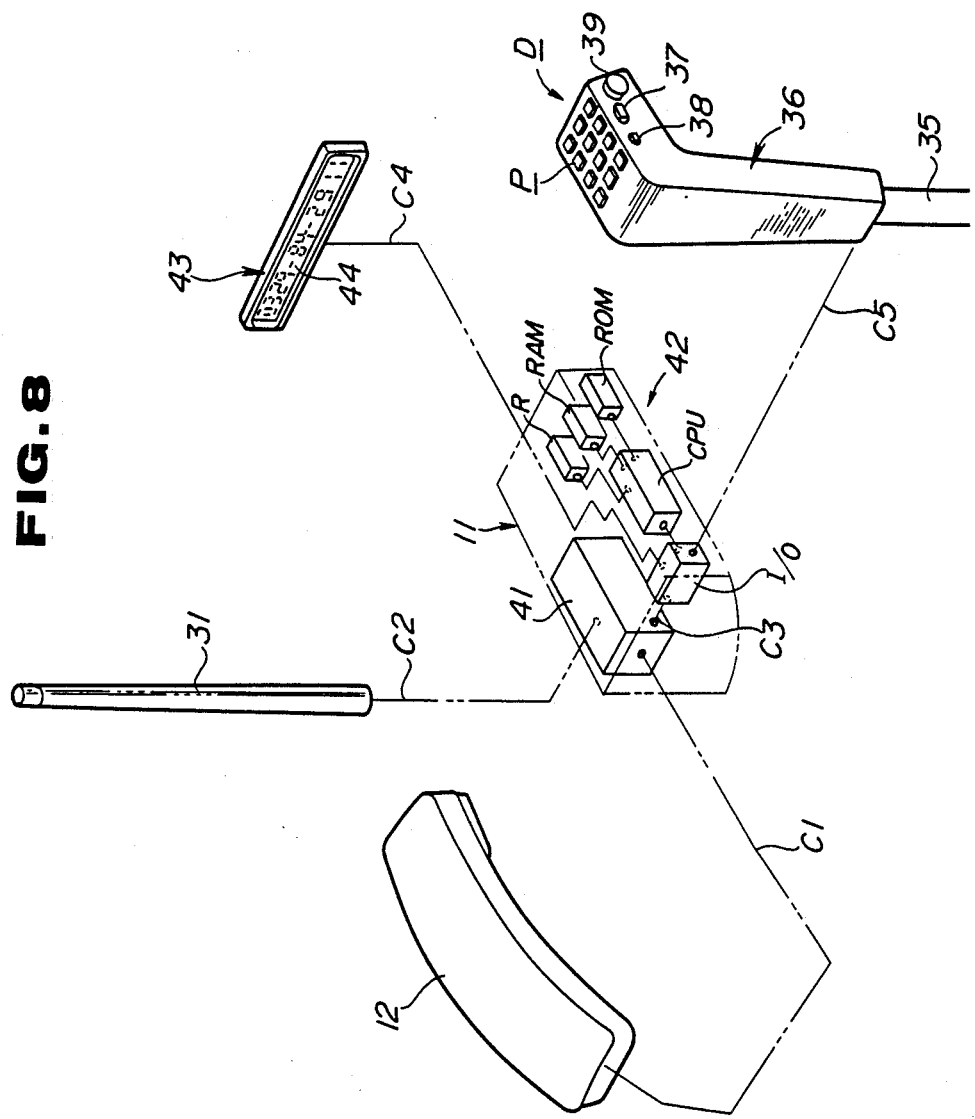

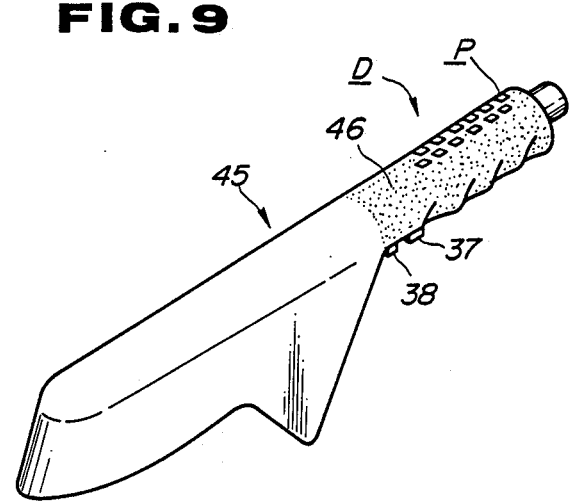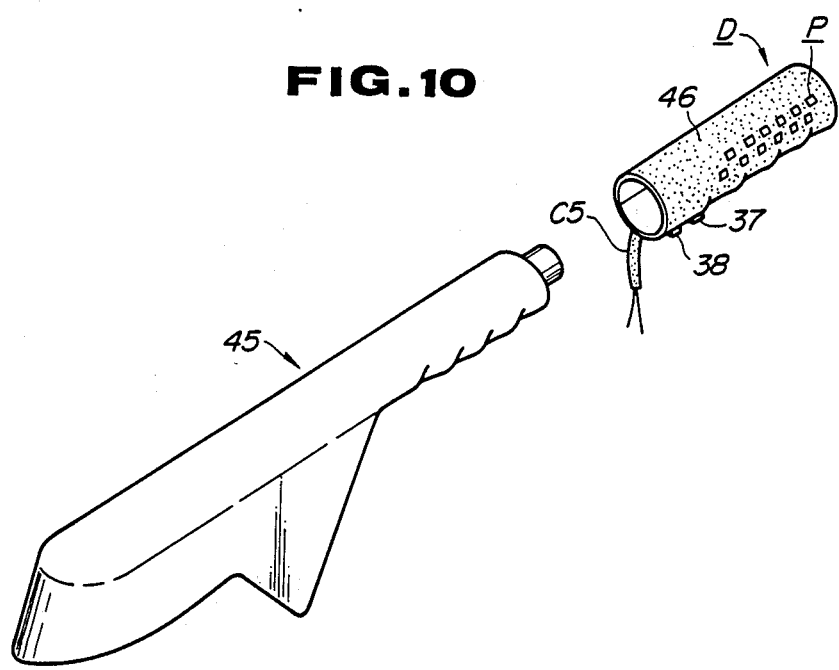

AUTOMOBILE TELEPHONE UNIT

TECHNICAL FIELD

The present invention relates to an automobile telephone unit.

BACKGROUND ART

Automobile telephone units are in widespread use in recent years. Japanese Laid-Open Patent Publication No. 61-122049 discloses one such automobile telephone unit for use on an automobile. The disclosed automobile telephone unit is mounted on a support base movable along the rear surface of a support post mounted vertically on the upper surface of a central console, the support base being angularly movable in the direction of forward movement of the automobile, about a pin disposed on the upper end of the support post. When not in use, the telephone unit is positioned in overlapping relation to the rear surface of the support post. To use the telephone unit, the support base is moved along the support post up to the upper end of the support post. When the support base has reached the upper end of the support post, then the support base is angularly moved forwardly into a horizontal position. The handset is lifted from the main telephone unit body to energize the telephone unit after which pushbuttons on the dial in the handset are pushed to establish contact with the telephone set of the party being called. When the telephone unit is not in use, it is positioned behind the central console out of physical interference with the driver who is driving the automobile.

Automobile telephone units have a so-called hookswitch as with telephone units for home use. When the handset of an automobile telephone unit is lifted, the telephone unit is energized. While the automobile is running especially on a rough road, the automobile may be vibrated so strongly that the handset may come off the main telephone nit body, energizing the telephone unit regardless of the fact that the user does not intend to use the telephone unit.

The driver of an automobile, when driving the automobile, is required to watch ahead of the automobile and also pay attention to other automobiles running around. When lifting the handset of a telephone unit on the automobile and pressing desired pushbuttons on the handset while the automobile is running, the driver must look at the dial in order to select the proper pushbuttons. It would not easy, however, for the driver to successively push the desired pushbuttons accurately among ten numerical pushbuttons bearing the numbers 0 through 9, while at the same time directing his attention to any automobiles running nearby There is a demand for a device for allowing the driver to accurately dial the telephone number of a party to be called without looking at the handset.

An automobile telephone unit disclosed in Japanese Laid-Open Utility Model Publication No. 57-8142 is installed in a box which can be pulled out from the central console of an automobile toward the backseat thereof. Japanese Laid-Open Utility Model Publication No. 57-22455 discloses another automobile telephone unit which can be pulled longitudinally out of an armrest on the backseat of an automobile for use. These automobile telephone units are apparently designed for use primarily by a passenger on the backseat.

DISCLOSURE OF THE INVENTION

It is a major object of the present invention to provide an automobile telephone unit which is prevented from being energized upon vibration of the automobile on which the automobile telephone set is installed.

To achieve the above object, there is provided in accordance with the present invention an automobile telephone unit including a main body housing a takeup mechanism including a reel, a handset placed on the main body when not in use and connected to one end of a connector cord wound around the reel, and switch means for detecting withdrawal of the connector cord from the takeup mechanism to energize the telephone unit when the connector cord is pulled out a predetermined length and to de-energize the telephone unit when the connector cord is rewound a predetermined length. Even when the handset is removed from the main body due to vibration of the automobile while running on a rough road, the telephone unit is not energized unless the connector cord is pulled out the predetermined length.

Another object of the present invention is to provide an automobile telephone unit which allows the user to dial a telephone number easily and prevents the user from operating the telephone unit erroneously.

According to an embodiment of the present invention, a telephone number dialing device including a pushbutton dialing mechanism is incorporated in a shift lever. The user of the telephone, who is the driver of an automobile, operates the pushbuttons on the shift lever without using the pushbuttons on the handset after the handset has been removed from the main body. A telephone number which is dialed at this time is displayed on the liquid crystal display of a telephone number display unit. After the user has confirmed the displayed telephone number, an actual outgoing call is placed through the telephone number, and hence there is no danger of placing a wrong call. The telephone number display unit should preferably be mounted of a steering column cover which the driver can see with utmost ease. Alternatively, the telephone number dialing device may be incorporated in either an operating lever mounted on a steering column cover or a rearview mirror angle control device.

Still another object of the present invention is to provide a movable automobile telephone unit which is movable to such a position to allow a passenger on the front seat or the rear seat of an automobile to lift a handset easily for placing a call or answering a call.

According to an embodiment of the present invention, a central console comprises upper and lower consoles, the upper console housing the telephone unit and movable back and forth with respect to the lower console. Alternatively, guide rails may be mounted longitudinally on the roof of an automobile cabin, and the telephone unit may be movably disposed on the guide rails. The telephone unit can therefore be moved by a passenger toward the front seat or the backseat on which the passenger is seated.

BRIEF DESCRIPTION OF THE DRAWINGS

FIG. 3 is a side elevational view of the automobile telephone unit, with a protective cover in a closed position;

FIG. 4 is a side elevational view of the automobile telephone unit, with the protective cover in an open position;

FIG. 8 is a perspective view showing the overall system of the automobile telephone unit shown in FIG. 6;

FIG. 9 is an enlarged perspective view of a parking lever with a telephone number dialing device incorporated therein;

FIG. 10 is a view similar to FIG. 9, showing a modified parking lever incorporating a telephone number dialing device, with a grip being shown as detached from a parking lever body;

BEST MODE FOR CARRYING OUT THE INVENTION

Figure 1:
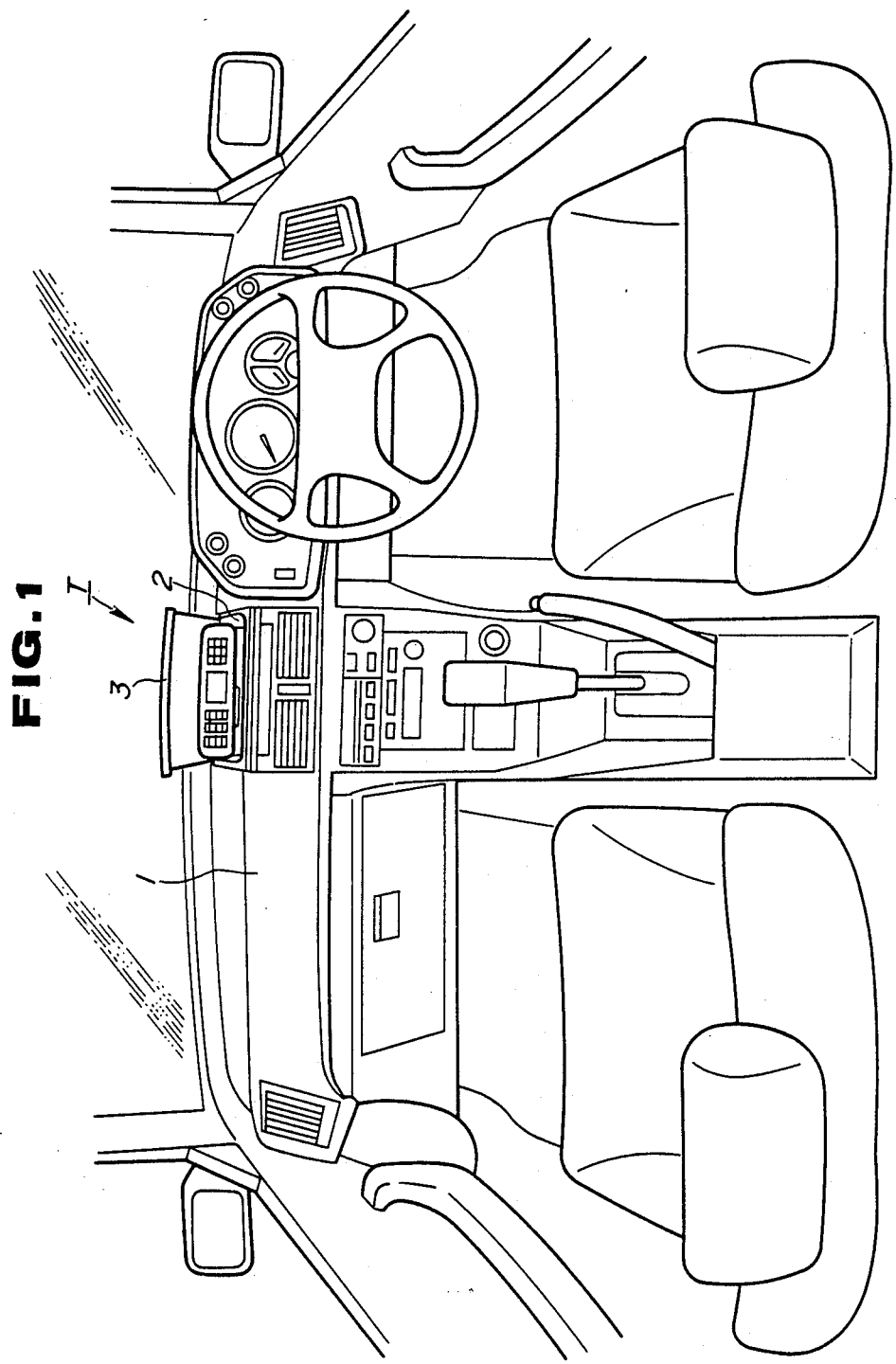
FIG. 1 is a view of the cabin of an automobile, showing the manner in which an automobile telephone unit of the present invention is installed.

Identical reference numerals denote identical or similar components throughout views.

Figure 2:
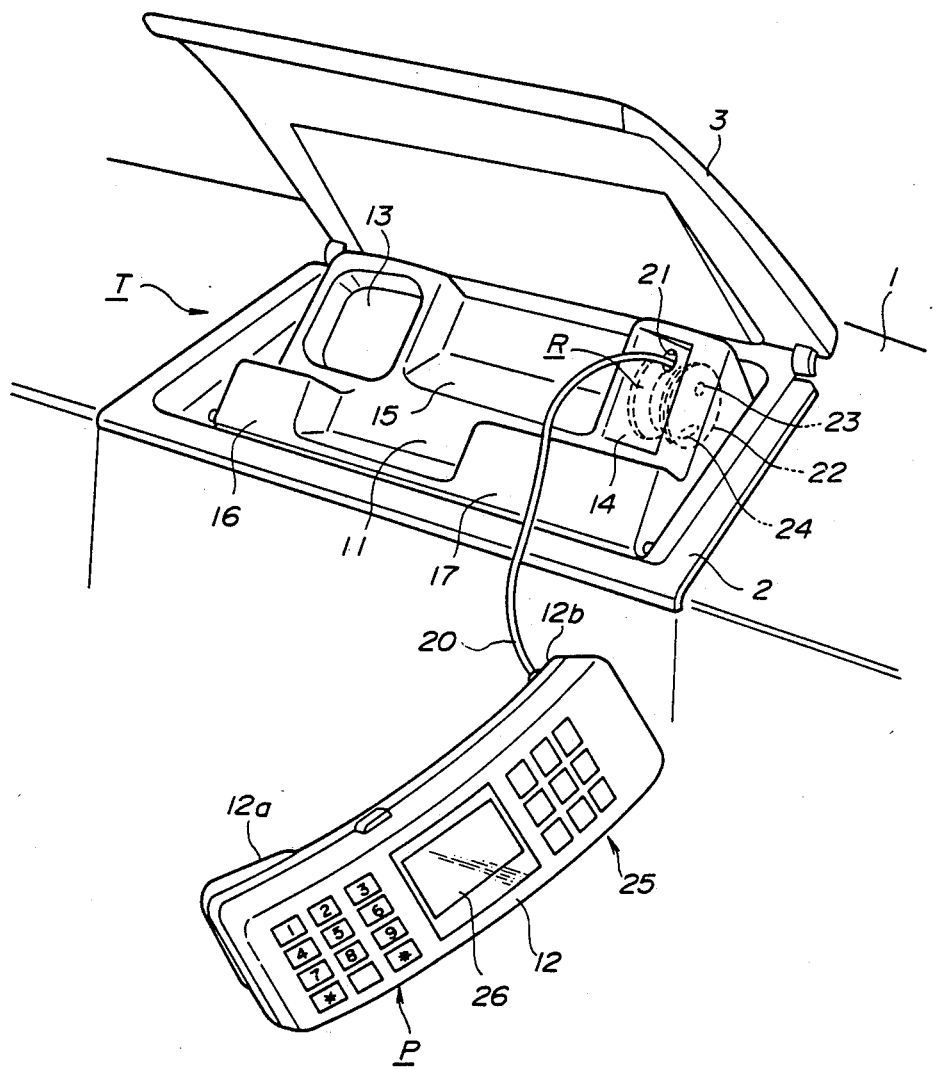
FIG. 2 is an enlarged perspective view of the automobile telephone unit shown in FIG. 1, with a handset removed from a main telephone unit body.

As shown in FIGS. 1 and 2, a case 2 is mounted centrally in a dashboard 1 positioned in a front portion of the cabin of an automobile. An automobile telephone unit T according to the present invention is housed in the case 2. When the telephone unit T is not in use, it is protected by a protective cover 3 which closes an open upper end of the case 2 as shown in FIG. 3. The cover 3 has rectangular pieces 4 projecting from opposite ends of the reverse side thereof, and is pivotally coupled to the case 2 by pins 6 projecting from the case 2 and inserted through holes 5 defined in the projecting pieces 4 A sector gear 7 is fixed to the distal end of one of the projecting pieces 4 and held in mesh with a gear 8 rotatably mounted on a shaft (not shown) projecting from an outer surface of the case 2. A spring 10 has one end engaging a pin 9 projecting from the outer surface of the case 2 and the other end engaging the sector gear 7. The cover 3 is urged by the spring 10 into either a closed position (see FIG. 3) or an open position (see FIG. 4). When the cover 3 is opened at an angle smaller than about 45°, then it is automatically turned into the closed position. When the cover 3 is opened at about 45°, then it is held in that position. When the cover 3 is opened at an angle larger than 45°, then it is turned into the open position without applying external forces to the cover 3.

The telephone unit T comprises a main body 11 swingably mounted as a carrier in the case 2, and a handset 12 which is placed in position on the main body 11 when not in use. As illustrated in FIGS. 3 and 4, the main body 11 is of a substantially L shape as viewed in side elevation, and has an arcuate bottom substantially complementary to the bottom of the case 2. As illustrated in FIG. 2, the main body 11 has a plurality of cavities in its upper surface, which include a cavity 13 for accommodating a receiver 12a of the handset 12 and a cavity 14 for accommodating a transmitter 12b of the handset 12, the cavities 13, 14 being positioned at opposite ends of the main body 11. Another cavity 15 positioned between the cavities 13, 14 provides a space for allowing a user's hand to be inserted therein for lifting the handset 12 from the main body 11. The main body 11 has ridges 16, 17 disposed adjacent to these cavities for positioning and supporting the handset 12 when the telephone nit T is in the position of FIG. 4. Two laterally spaced springs 18 disposed in the lower surface of the main body 11 have free ends engaging the inner surface of the case 2. When the cover 3 is turned into the open position as shown in FIG. 4, the telephone unit T is angularly moved about a pin 19 from within the case 2 toward the user, i.e., clockwise in FIG. 4.

In the illustrated embodiment, a reel R is disposed in the main body 11 adjacent to the cavity 14, and a connector cord 20 with one end coupled to the handset 12 is wound around the reel R. The telephone set T is energized by unreeling the connector cord 20 from the reel R a predetermined length, e.g., about 40 cm. More specifically, as shown in FIG. 2, a hole 21 is defined in the bottom of the cavity 14, and the connector cord 20 is inserted through the hole 21 into the main body 11 and wound around the reel R. To the reel R, there is connected a rotary plate 22 through speed reducer gears (not shown). When the reel R makes 10 revolutions, for example, the rotary plate 22 makes a substantially one revolution, for example, through the action of the speed reducer gears. The revolution of the rotary plate 22 causes a pin 23 thereon to contact an actuating arm of a limit switch 24 mounted in the main body 11 to energize the telephone unit T. Conversely, when the connector cord 20 is rewound on the reel R, the rotary plate 22 is rotated in response to rotation of the reel R to bring the pin 23 into contact with the actuating arm of the limit switch 24 again, de-energizing the telephone unit T.

It can easily be understood by one ordinary skilled in the art that the mechanical switch described above may be replaced with an optical switch. For example, an optical switch may be combined with a counter, and the reel R may have a reflecting mark thereon, so that light pulses reflected by the mark can be counted by the counter. When the counter counts up two light pulses, the switch is turned on, and when the counter counts down two light pulses the switch is turned off.

As illustrated in FIG. 2, the handset 12 has a keypad P disposed on the lefthand side thereof comprising twelve pushbuttons including those bearing numbers 0 ~9, another keypad 25 disposed on the righthand side thereof and including pushbuttons for performing various functions, and a liquid crystal display 26 disposed on the center thereof for displaying a telephone number.

Figure 5:
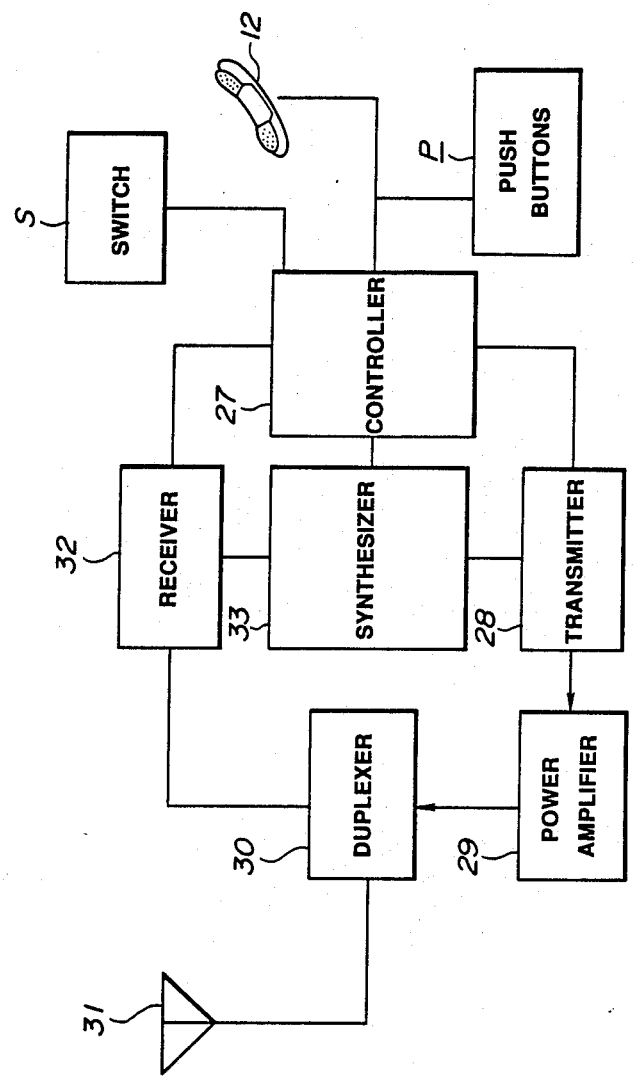
FIG. 5 is a block diagram of an electric circuit arrangement of the automobile telephone unit.

A telephone unit circuit will briefly be described with reference to FIG. 5. When a switch S is closed, a controller 27 generates a circuit connecting signal as a calling signal. This signal is sent through a transmitter 32, a power amplifier 29, and a duplexer 30, and transmitted from an antenna 31. A voice signal is sent from the handset 12 in the same manner. A signal from the party being called or placing a call is delivered from the antenna 31 through the duplexer 30, a receiver 32, and the controller 27 to the handset 12. The intermediate frequency produced in transmission and reception modes is changed by a synthesizer 33 in response to a command signal from the controller 27.

Figure 6:
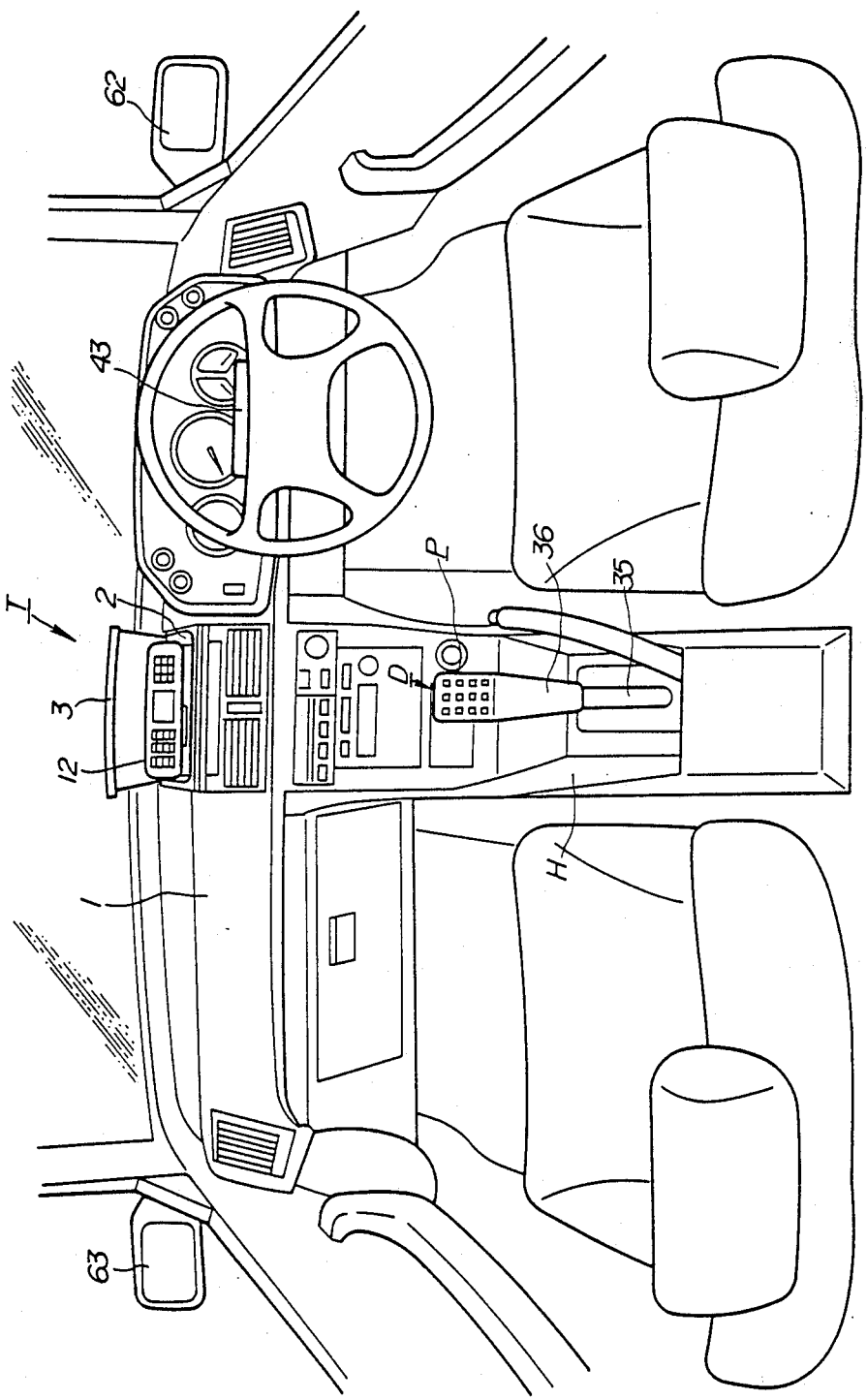
FIG. 6 is a view similar to FIG. 1, illustrating an automobile telephone unit according to another embodiment of the present invention.

As shown in FIG. 6, a telephone number dialing device D including twelve pushbuttons P may be mounted on a shift lever 35. In this case, the pushbuttons P may not necessarily be mounted on the handset 12. In the illustrated embodiment, the telephone number dialing device is mounted on the shift lever for use with an automatic transmission However, the telephone number dialing device may be mounted on a shift lever for use with a manual transmission.

Figure 7:
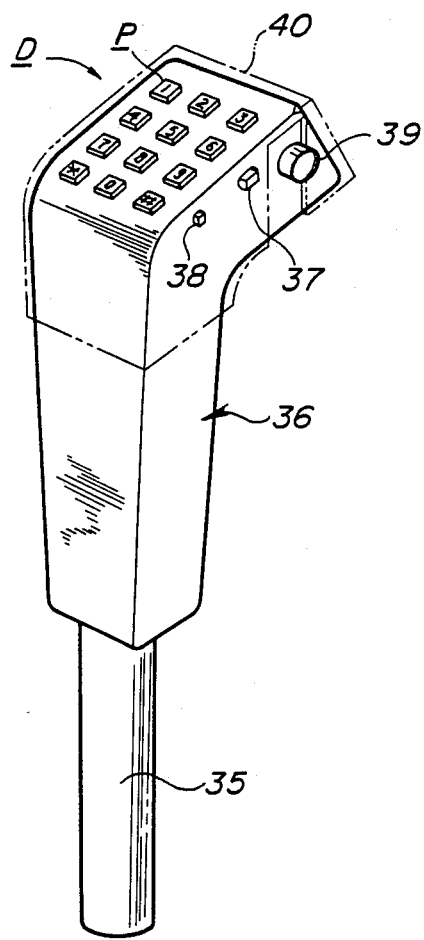
FIG. 7 is an enlarged perspective view of a shift lever incorporating a telephone number dialing device.

As shown in detail in FIG. 7, the twelve pushbuttons P including those bearing numerals 0 ~9 for dialing a telephone number are arranged in a known sequence on the upper surface of a grip 36 on the upper end of the shift lever 35. Two switch buttons 37, 38 are mounted on a side (facing the driver) of the grip 36 which is of a substantially L shape. The switch button 37 is coupled to an auxiliary hookswitch and is selectively movable into two different positions. When the auxiliary hookswitch button 37 is in the first position, it projects largely from the side of the shift lever grip 36, when the auxiliary hookswitch button 37 is in the second position, it projects less from the side of the shift lever grip 36. By shifting the auxiliary hookswitch button 37 from the first position to the second position, the telephone unit T is de-energized even if the connector cord 20 is not rewound on the reel R. When the auxiliary hookswitch button 37 is shifted to the first position, the telephone unit T is energized without pulling the connector cord 20 by the predetermined length even if the handset 12 is placed on the main body 11. The switch button 38 which is positioned near and behind the auxiliary hookswitch button 37 is a redialing switch button. An unlocking button 39 of a greater size is positioned on the side of the grip 36 forwardly of the auxiliary hookswitch button 37. By pushing the unlocking button 39, the shift lever 35 is unlocked so that it can be moved from a "parking" position into a "drive" position. As indicated by the broken lines, a detachable protective cover 40 may be mounted on the upper end of the grip 36 of the shift lever 35. If the protective cover 40 is mounted, the auxiliary hookswitch button 37 is held against an inner surface of the cover 40 when it is in the second position.

As illustrated in FIG. 8, the main telephone unit body 11 accommodates therein a telephone circuit 41 electrically connected to the handset 12 and the antenna 31 through connector cords C1, C2, and a control circuit 42 electrically connected the telephone circuit 41 through a connector cord C3. The control circuit 42 includes an input/output bus I/0 serving as an interface, and a central processing unit CPU connected to the input/output bus I/0. The central processing unit CPU has a register R, a random-access memory RAM, and a read-only memory ROM. A telephone number display unit 43 having a liquid crystal display 44 is mounted on an upper portion of a steering column (see FIG. 11), and is electrically connected to the input/output bus I/0 through a connector cord C4. The telephone number dialing device D d the input/output bus I/0 are electrically connected to each other via a connector cord C5.

When the pushbuttons P are pressed to dial a desired telephone number, signals are successively transmitted from the telephone number dialing device D through the input/output bus I/0 to the central processing unit CPU. In response to the transmitted signals, the central processing unit CPU transmits the digits of the telephone number, successively from the high-order position thereof, to the register R. The digits stored in the register R are then sent through the central processing unit CPU and the input/output bus I/0 to the display unit 43 which then enables the liquid crystal display 44 to display the digits. During this time, the central processing unit CPU checks at all times whether the digits applied to the register R have reached a required digit number. This checking process is performed based on the number of digits of telephone numbers and the number of digits of area code stored in the read-only memory ROM. For example, when a telephone number starting with "03", which is the area code for Tokyo wards, is dialed, the central processing unit CPU determines that the applied digits have reached the required digit number when 7 telephone number digits have been applied. When the central processing unit CPU determines that the applied digits have reached the required digit number, the central processing unit CPU applies a command signal to start signal transmission to the telephone unit of the party designated by the telephone number stored in the register R, to the telephone circuit 41 through the input/output bus I/0. Upon reception of the command signal by the telephone circuit 41, the antenna 31 transmits a signal wave to a switching office. Where a loudspeaker (not shown) is mounted in the main body 11, it allows the user to confirm whether the call is accepted by the telephone unit of the other party, even if the handset 12 is not held against an ear of the user. Rather than the loudspeaker, the liquid crystal display 44 may display that the call is accepted.

The central processing unit CPU has a function to cancel all data stored in the register R if no signal is applied for a certain period of time, a function to prevent any data from being applied to the register R if two pushbuttons P are simultaneously pushed, and also a function to display on the display 44 the telephone number of the other party until the call is finished. If a wrong pushbutton P is pressed, then a cursor (not shown) on the display 44 is moved to the left or right by pushing a pushbutton bearing the mark "*" or "#" until the cursor reaches the wrong digit, and then a proper pushbutton P is pushed to correct the wrong digit.

When the automobile is running a rough road and hence is not stable, or running along a curve, the driver has to pay particular attention to the outside of the automobile. If the driver is placing a call through the telephone unit under such a condition, a wrong pushbutton may be pushed in error or a long time lag may occur between the last digit and a next digit to be dialed. With a telephone unit for home use, a call cannot be placed unless a desired telephone number is dialed by successively pushing pushbuttons within a relatively short period of time. According to the present invention, the central processing unit CPU does not transmit a command signal to start signal transmission to the telephone circuit 41 unless all the digits of a telephone number, which meet a required digit number, are applied to the register R. Therefore, the failure to place a call under the aforesaid condition is prevented.

FIGS. 9 and 10 show different embodiments of the present invention. In each of these embodiments, a telephone number dialing device D is mounted on a parking lever 45 projecting from an upper surface of a central console H (FIG. 11) behind the shift lever 35. According to the embodiment shown in FIG. 9, pushbuttons P are mounted on an upper peripheral surface of a grip 46 on the distal end of the parking lever 45, and an auxiliary hookswitch button 37 and a redialing switch 38 are mounted on a lower peripheral surface of the grip 36 in diametrically opposite relation to the pushbuttons P. According to the embodiment of FIG. 10, pushbuttons P are mounted on a side (facing the driver) of the grip 46. The structure in a main telephone unit body associated with each of these telephone number dialing device D is the same as that of the previous embodiment, and will not be described.

Figure 11:
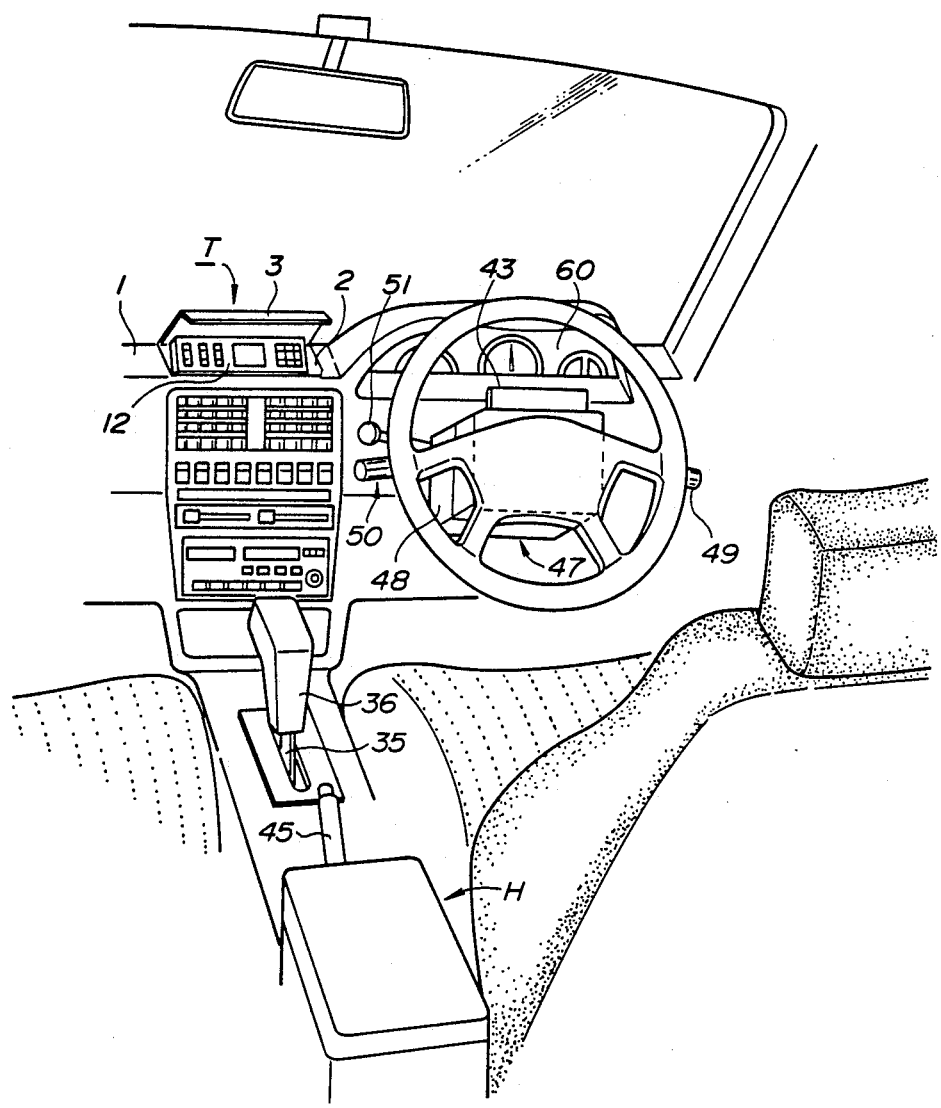
FIG. 11 is a view of the cabin of an automobile, showing an operating lever, which is part of a telephone number dialing device, attached to a steering column.

Still another embodiment of the present invention will be described with reference to FIG. 11. A column cover 48 in the shape of a box is mounted on a steering column 47. A winker lever 49 or directional indicator is mounted on a righthand side wall of the column cover 48, and a lever 50 serving as a wiper switch is mounted on a lefthand side wall of the column cover 48. An operating lever 51 which is part of a telephone number dialing device D is mounted on the column cover 48 adjacent to the lever 50.

Figure 12:
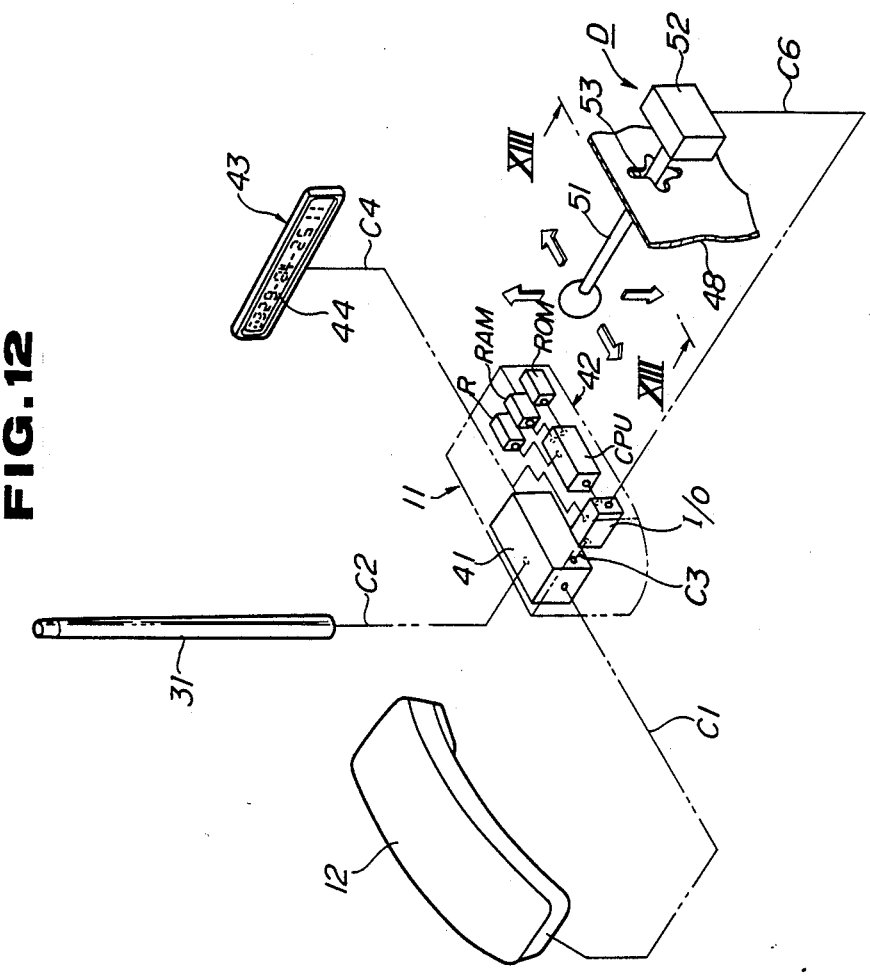
FIG. 12 is a view similar to FIG. 8, showing the overall system of the automobile telephone unit of FIG. 11.
Figure 14:
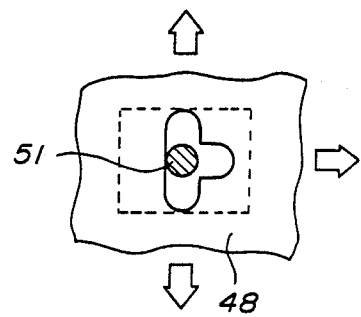
FIG. 14 is a view similar to FIG. 13, illustrating a modified guide groove.

As shown in detail in FIG. 12, the operating lever 51 has a proximal end swingably coupled to a switch box 52 in the column cover 48. The switch box 52 is electrically connected to an input/output bus I/0 through a connector cord C6. A main telephone unit body 11 including the input/output bus I/0 is identical in structure to that in the previous embodiment, and will not be described in detail. The column cover 48 has a crisscross guide groove 53 (FIG. 13) defined in the lefthand side wall thereof, in and along which the operating lever 51 is movable. When the telephone unit T is not in use, the operating lever 51 is held at the center of the guide groove 53 under the resiliency of a spring (not shown). The guide groove 53 is not limited to the illustrated shape, but may be of a modified shape as shown in FIG. 14.

Operation will be described with reference to FIGS. 12 and 13. When the operating lever 51 is moved from the center, i.e., an inoperative position, of the guide groove 53 to the left or right in FIG. 13, the central processing unit CPU is operated. Then, when the operating lever 51 is swung upwardly, a signal is transmitted from the switch box 52 via the input/output bus I/0 to the central processing unit CPU which then starts counting transmitted signals. The counted digit, here "1", is sent from the central processing unit CPU through the input/output bus I/0 to the liquid crystal display 44 which displays the digit at the leftmost end thereof. The operating lever 51 is returned to the center and then moved upwardly again, whereupon the displayed digit is incremented by 1. The operating lever 51 is repeatedly moved upwardly until the displayed digit coincides with the first digit of the telephone number of a party to be called, whereupon the operating lever 51 is swung to the left in FIG. 13. In response to the leftward movement of the operating lever 51, the telephone number dialing device D sends a signal via the input/output bus I/0 to the central processing unit CPU, which then stores the digit in the register R. Thereafter, the operating lever 51 is moved upwardly to display "1" on the liquid crystal display 44 at the second position next to the leftmost end thereof. The operating lever 51 is clicked back and forth until a desired digit is displayed. If the digit displayed on the liquid crystal display 44 is larger than a desired digit, then the operating lever 51 is moved downwardly along the guide groove 53 to correct the digit. More specifically, when the operating lever 51 is moved downwardly, a signal is generated by the telephone number dialing device D and delivered via the input/output bus I/0 to the central processing unit CPU, which then applies a count-down signal to the display unit 43. The digit displayed on the display 44 is decremented by 1 each time the operating lever 51 is moved downwardly. After the corrected digit has been confirmed on the display 44, the operating lever 51 is moved to the left in FIG. 13 to store the digit in the register R.

Figure 13:
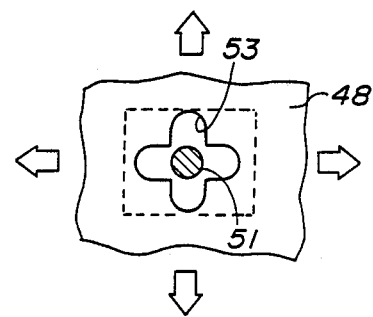
FIG. 13 is an enlarged cross-sectional view taken along line XIII—XIII of FIG. 12.

After all the digits of the desired telephone number have been displayed on the display 44 by repeating the above digit input process, the operating lever 51 is then moved to the right in FIG. 13. The telephone number dialing device D issues an output signal via the input/output bus I/0 to the central processing unit CPU. The central processing unit CPU generates a signal to start signal transmission on and sends this signal to the telephone circuit 41 via the input/output bus I/0.

Figure 15:
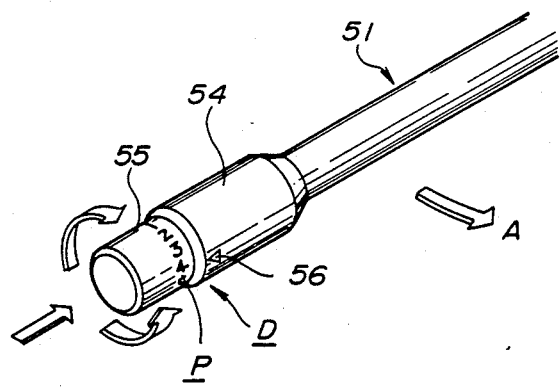
FIG. 15 is a fragmentary perspective view of a modified operating lever constituting part of the telephone number dialing device of FIG. 12.

FIG. 15 illustrates yet another embodiment of the present invention. An operating lever 51 of this embodiment also constitutes part of a telephone number dialing device, but differs from the operating lever of the preceding embodiment in that it can dial a telephone number by turning itself about its own axis and swinging itself as shown. The operating lever 51 shown in FIG. 15 has a larger-diameter free end 54 in which a cylindrical operating member 55 is inserted. The operating member 55 is angularly movable about the central axis of the operating lever 51 and also movable in the axial direction of the operating lever 51. The operating member 55 bears marked numerals 0 ~9 on its outer peripheral surface. By bringing any of the marked numerals into alignment with a triangle mark 56 on the end 54, the telephone number dialing device D transmits a signal indicating that numeral to the central processing unit CPU through the input/output bus I/0.

Operation will briefly be described below. First, the operating lever 51 is swung in the direction of the arrow A in FIG. 15 to bring the central processing unit CPU into an operative condition. Then, the operating member 55 is turned about its own axis to align the marked numeral which is the same as the first digit of the telephone number of a party to be called, with the mark 56, after which the operating member 55 is pushed toward the steering column 47 to store the digit in the register R. Thereafter, the operating member 55 is turned to align the marked numeral which is the same as the second digit of the desired telephone number, with the mark 56, and the operating member 55 is pushed axially. The above process is repeated to display the desired telephone number, successively from the high order digit, on the liquid crystal display 44. After all the telephone number digits have been dialed, the displayed telephone number is confirmed on the display 44, and the operating lever 51 is swung in the direction of the arrow A to enable the telephone number dialing device D to generate and transmit a signal via the input/output bus I/0 to the central processing unit CPU. The central processing unit CPU then applies a signal for starting signal transmission to the telephone unit of the telephone number stored in the register R, to the telephone circuit 41 through the input/output bus I/0.

Figure 16:
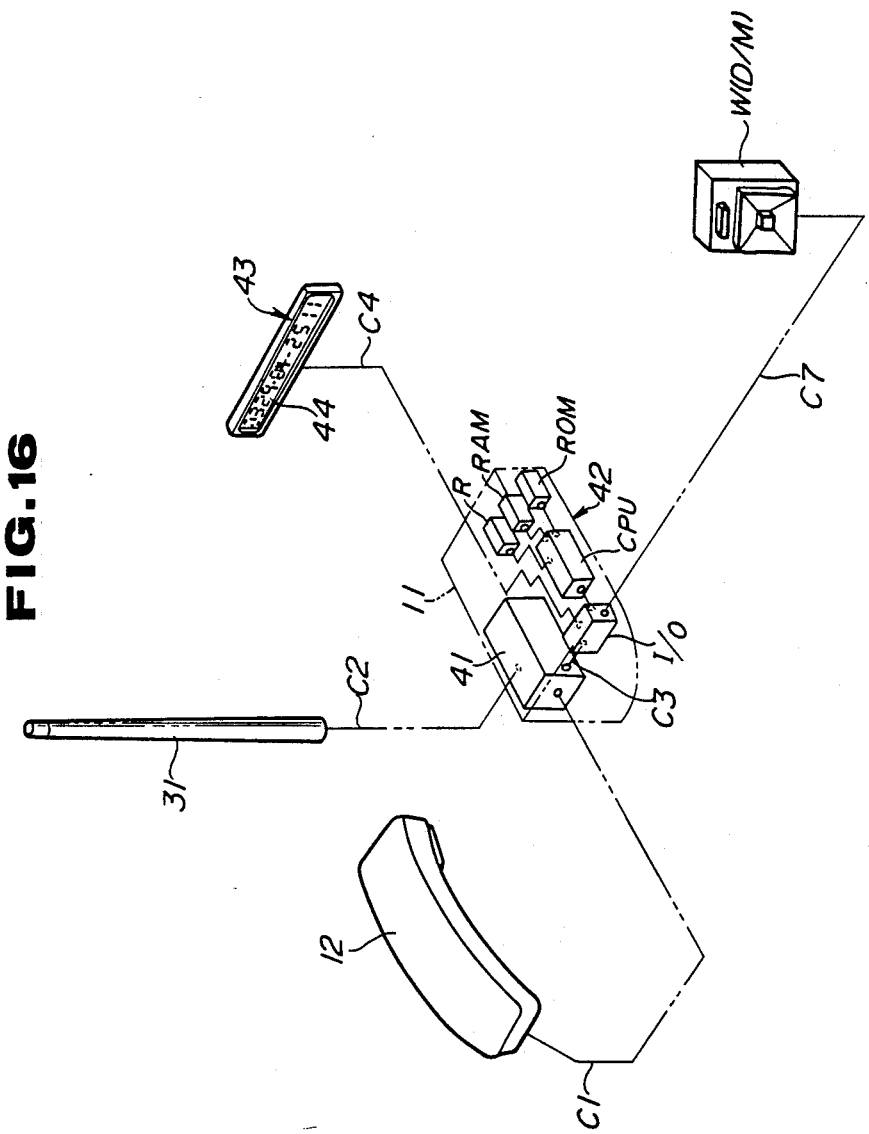
FIG. 16 is a view similar to FIG. 8, with a telephone number dialing device doubling as a rearview mirror angle control device.
Figure 18:
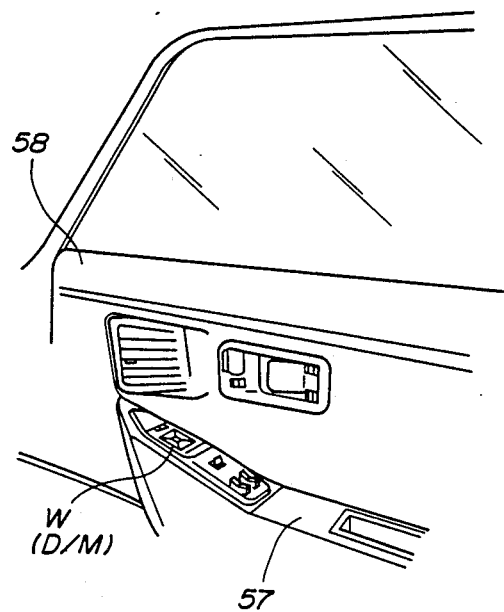
FIG. 18 is a fragmentary perspective view showing the telephone number dialing device/rearview mirror angle control device combination of FIG. 17 installed in a door box.
Figure 19:
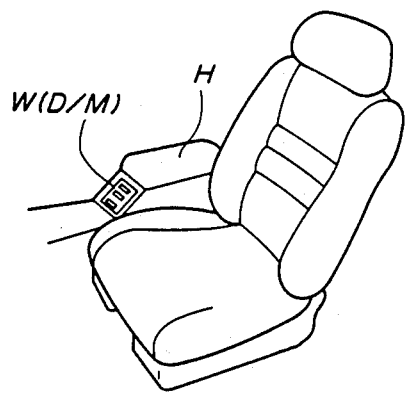
FIG. 19 is a perspective view showing the telephone number dialing device/rearview mirror angle control device combination of FIG. 17 installed in a central console.
Figure 20:
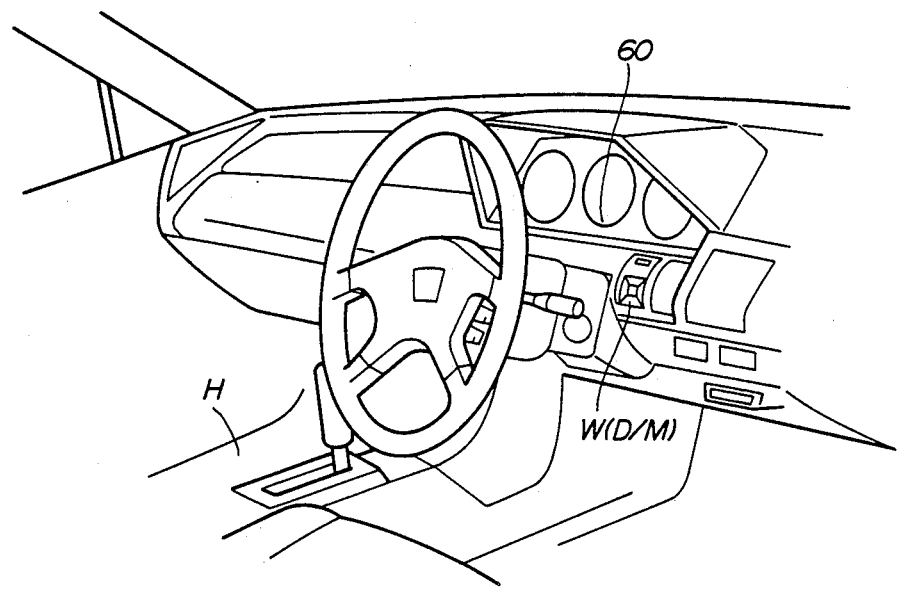
FIG. 20 is a perspective view showing the telephone number dialing device/rearview mirror angle control device combination of FIG. 17 installed in an instrumental panel.

According to a further embodiment shown in FIG. 16, a telephone number dialing device doubles as a rearview mirror angle control device. The combination device, indicated at W (D/M), may be mounted in a door box 57 (FIG. 18) on a door 58 adjacent to the driver's seat, in a central console H (FIG. 19), or in an instrumental panel 60 (FIG. 20). The position of the combination device W (D/M) is however not limited to the illustrated locations. The combination device W is electrically coupled to the input/output bus I/0 through a connector cord C7 (FIG. 16).

Figure 17:
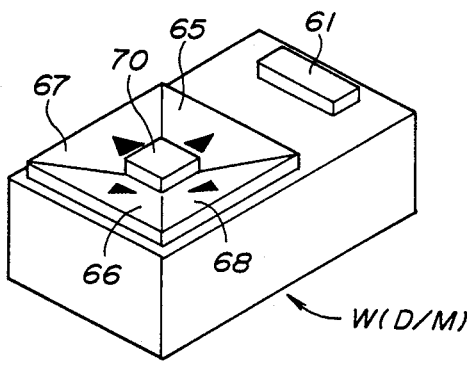
FIG. 17 is a perspective view of the telephone number dialing device/rearview mirror angle control device combination shown in FIG. 16.
Figure 21:
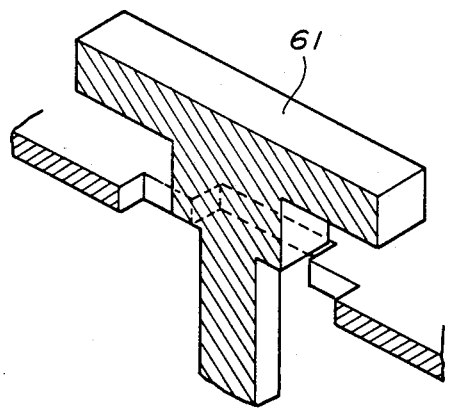
FIG. 21 is a perspective view of a selector switch of the telephone number dialing device/rearview mirror angle control device combination.

As shown in detail in FIG. 17, the combination device W is in the form of a box and has a selector switch 61 on its upper surface. The selector switch 61 is selectively shiftable into three positions as illustrated in FIG. 21. When the selector switch 61 is moved to the right in FIG. 21, the combination device W functions as a rearview mirror angle control device M for varying the angle of inclination of a rearview mirror 62 (see FIG. 6) on the rigthand side of the automobile. When the selector switch 61 is moved to the left, the combination switch W functions as the rearview mirror angle control device M for varying the angle of inclination of a rearview mirror 63 (see FIG. 6) on the lefthand side of the automobile. When the selector switch 61 is positioned in a central position, the combination device D functions as the telephone number dialing device D. The combination device W has five other switches in the vicinity of the selector switch 61. These other switches include two switches 65, 66 in vertically opposite positions for adjusting the angle of vertical inclination of the rearview mirrors 62, 63, two switches 67, 68 in horizontally opposite positions for adjusting the angle of horizontal inclination of the rearview mirrors 62, 63, and a set switch 70.

When the selector switch 61 is moved to the central position to operate the combination device W as the telephone number dialing device D, depression of the above switches displays a desired telephone number on the liquid crystal display 44 of the telephone number display unit 43. The telephone number display unit 43 should preferably be located on the instrumental panel 60 or the steering column cover 48 which can easily be viewed by the driver who may be the user of the telephone unit. However, it is possible to combine the telephone number display unit 43 with a car radio receiver or an FM/AM car stereo system, and display a telephone number on the frequency display thereof.

Figure 22:
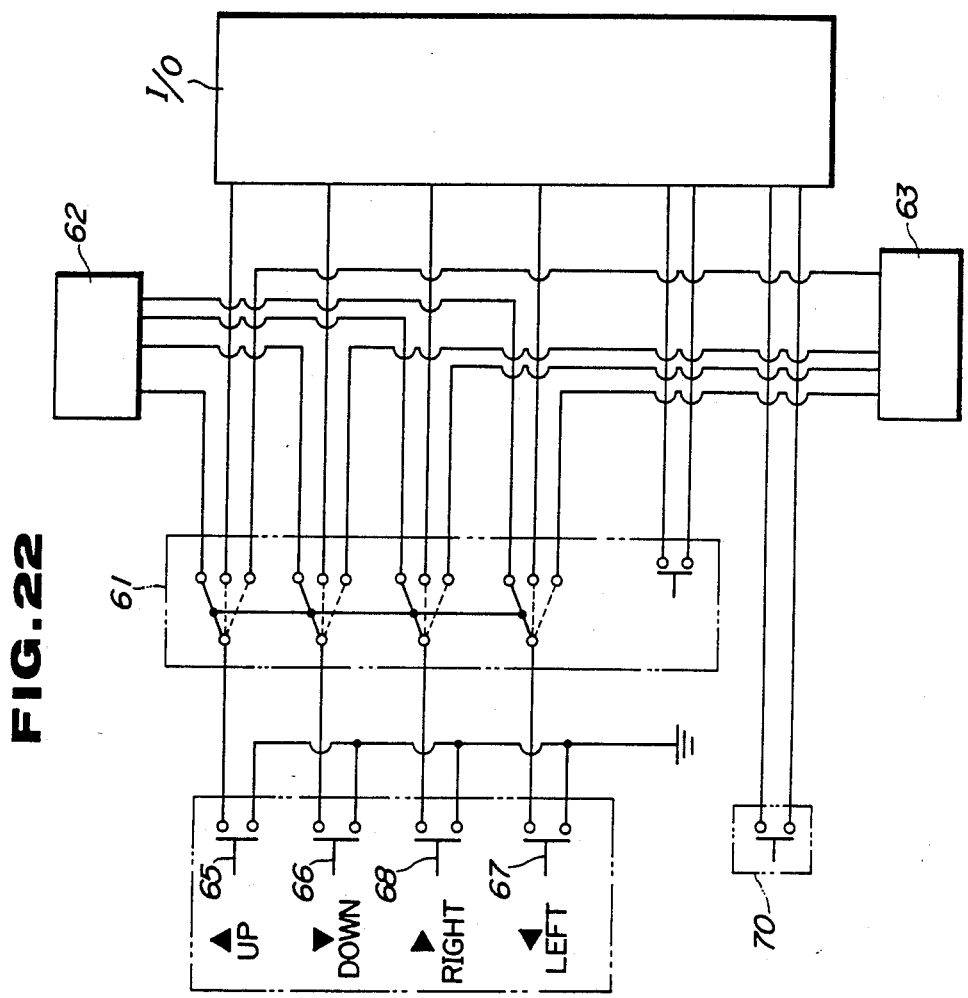
FIG. 22 is a circuit diagram of an electric circuit of the automobile telephone unit shown in FIG. 16.

When the switch 65 is depressed, a first digit is displayed on the display 44. The displayed digit is incremented by continuously pushing the switch 65, and decreased by continuously pushing the switch 66. Depression of the switch 68 moves the display position to the right, and depression of the switch 67 moves the display position to the left. After completion of the dialing of a desired telephone number, the displayed number on the display 43 is confirmed, and, if the displayed number is correct, the central set switch 70 is pushed to secure the number. Then, the start switch 61 is pushed to operate the central processing unit CPU to make the circuit of the telephone unit T and send a signal based on the telephone number. If the displayed telephone number is wrong, then the switch 67 or 68 is pushed to select the wrong digit. If the wrong digit is smaller than the desired digit, then the switch 65 is pushed, and if the wrong digit is larger than the desired digit, then the switch 66 is pushed, to correct the wrong digit. FIG. 22 shows an electric circuit for the combination device W (D/M).

Figure 23:
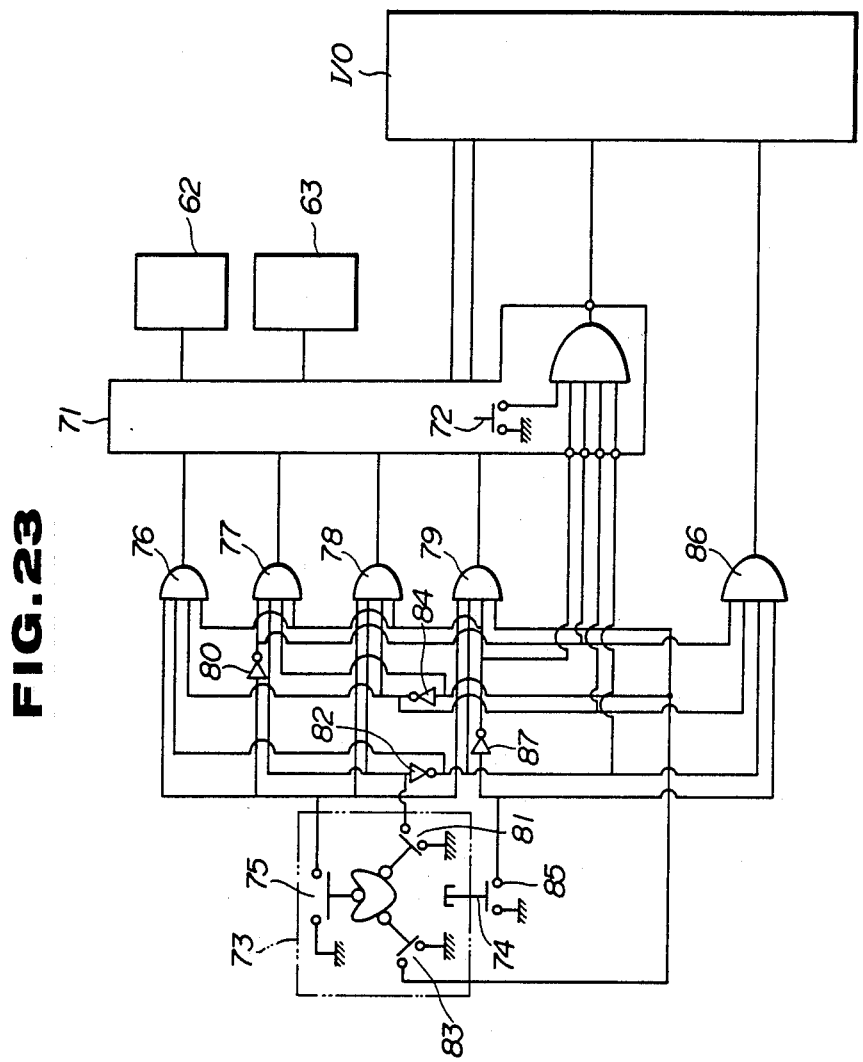
FIG. 23 is a circuit diagram showing a modification of the electric circuit illustrated in FIG. 22.

A modification of the electric circuit shown in FIG. 22 will be described with reference to FIG. 23. The modified circuit also has a selector switch 71, a start switch 72, an adjusting switch 73 for adjusting the angle of inclination of rearview mirrors, and a set switch 74.

The adjusting switch 73 has three contacts, i.e., first, second, and third contacts 75, 81, 83. One or two of these contacts can be closed by pushing four operating buttons (not shown) which are positioned respectively in upper, lower, left, and right positions. The first contact 75 is connected to an upwardly tilting AND gate 76, a downwardly tilting AND gate 77, a rightwardly tiling AND gate 78, and a leftwardly tilting AND gate 79, with a NOT gate 80 being connected between the first contact 75 and the AND gate 77. The second contact 81 is connected to the upwardly tilting AND gate 76, the downwardly tilting AND gate 77, the rightwardly tilting AND gate 78, and the leftwardly tilting AND gate 78, with a NOT gate 82 connected between the AND gates 76, 77. The third contact 83 is connected to the upwardly tilting AND gate 76, the downwardly tilting AND gate 77, the rightwardly tilting AND gate 78, and the leftwardly tilting AND gate 78, with a NOT gate 84 connected between the AND gates 76, 78. When the operating button disposed upwardly of the adjusting switch 73 is depressed, the first contact 75 is closed to enable the upwardly tilting AND gate 76. When the operating button disposed rightwardly of the adjusting switch 73 is depressed, the first and second contacts 75, 81 are closed to enable the rightwardly tilting AND gate 78. When the operating button disposed rightwardly of the adjusting switch 73, the second and third contacts 81, 83 are closed to enable the downwardly tilting AND gate 77. When the operating button disposed leftwardly of the adjusting switch 73, the first and third contacts 75, 83 are closed to enable the leftwardly tilting AND gate 79.

The set switch 74 has a contact 85 connected to a setting AND gate 86 and the four AND gates 76, 77, 78, 79 with a NOT gate 87 connected between the contact 85 and the AND gates 76, 77, 78, 79, all the AND gates 76, 77, 78, 79 are disabled by closing the contact 85.

Figure 24:
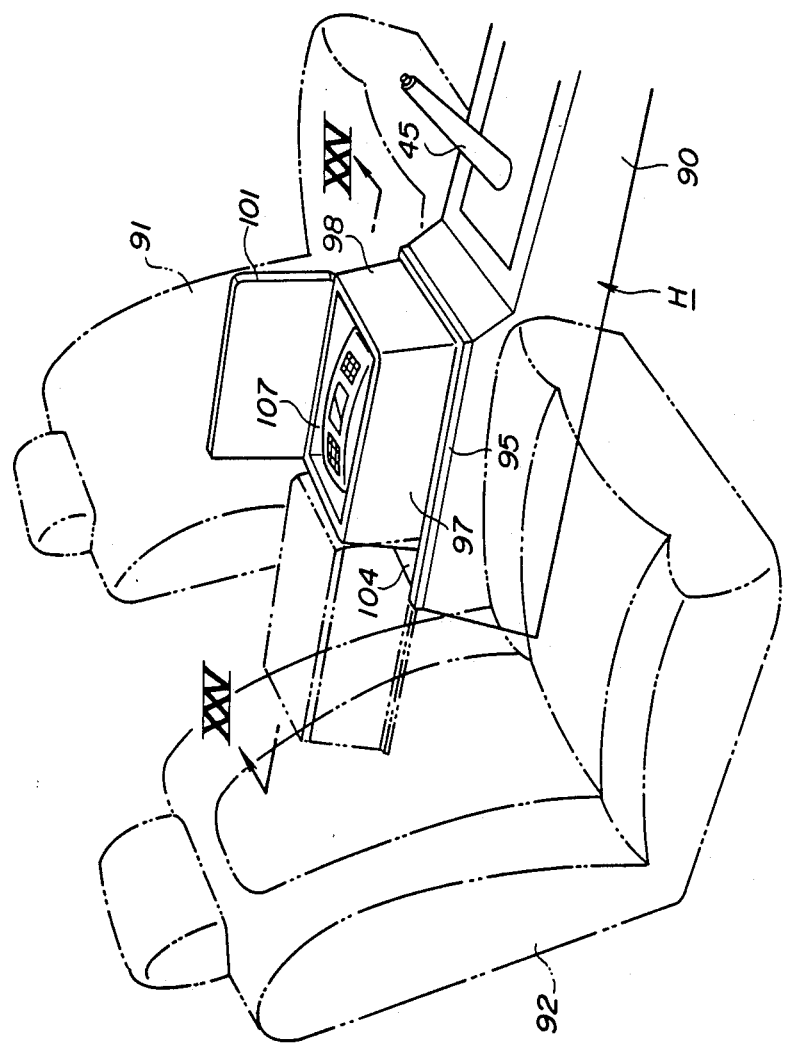
FIG. 24 is a view of a central portion of the cabin of an automobile, showing an automobile telephone unit of the invention installed in a central console.
Figure 25:
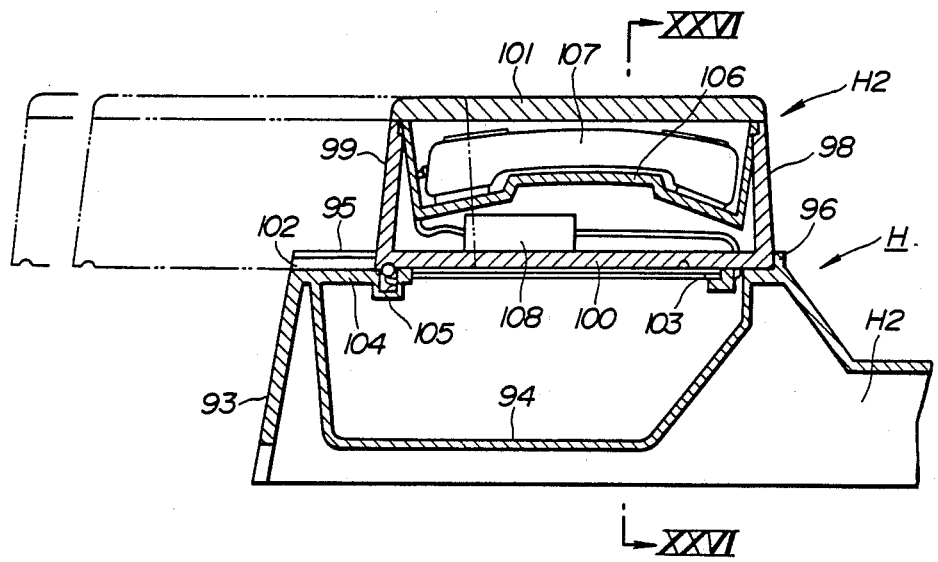
FIG. 25 is a cross-sectional view taken along line XXV—XXV of FIG. 24, with the automobile telephone unit shown in side elevation.
Figure 26:
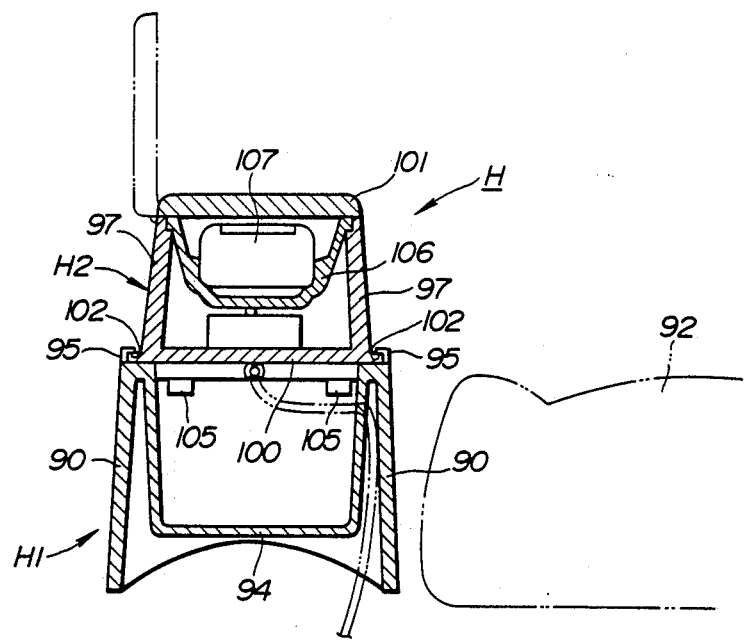
FIG. 26 is a cross-sectional view taken along line XXVI—XXVI of FIG. 25.

In each of the above embodiments, the telephone unit T is mounted on the dashboard 1. However, the telephone unit T may be installed in the central console H. As shown in FIGS. 24 through 26, two laterally space side walls 90 are vertically mounted on the floor of an automobile near the two front seats, and a rear wall 93 is disposed between the rear ends of the side walls 90. A storage case 94 which is of a substantially rectangular shape as viewed in plan and has an upwardly open end is accommodated between rear portions of the side walls 90. Two guide rails 95 each having an inverted L cross-sectional shape are disposed along laterally spaced edges where the side walls 90 and the storage case 94 are joined to each other. A stopper 96 in the form of a small block is disposed on a front edge between the front ends of the guide rails 95.

The central console H in the illustrated embodiment is of a double-console structure comprising a lower console H1 constructed as described above and an upper console H2 slidably mounted on the lower console H1. The upper console H2 is in the form of a box comprising laterally spaced side walls 97, front and rear side walls 98, 99, a bottom wall 100, and an upper cover 101 which is pivotally attached to the console box by means of a hinge (not shown). The bottom wall 100 has opposite ends projecting slightly laterally outwardly beyond the lower ends of the lateral side walls 97, and the projecting ends of the bottom wall 100 engage respectively in grooves 102 defined in the guide rails 95. The upper console H2 is slidably movable on the lower console H1 while being guided by the guide rails 95. Tow laterally spaced engaging members 103 are fixed to a front portion of the lower surface of the bottom wall 100. When the upper console H2 is moved toward the backseat as indicated by the broken lines in FIG. 25, the engaging members 103 engage laterally spaced stoppers 105, respectively, on the lower surface of a support panel 104 extending forwardly horizontally from the upper end of the rear wall 93 of the lower console H1.

Within the upper console H2, there is disposed a support base 106 suspended from the upper edges of the side walls 97 and supporting a handset 107. A main telephone unit body 108 accommodates therein a connector cord takeup mechanism including a reel, a telephone circuit, and other components. These components in the main telephone unit body 108 are the same as those described above, and will not be described in detail.

Figure 27:
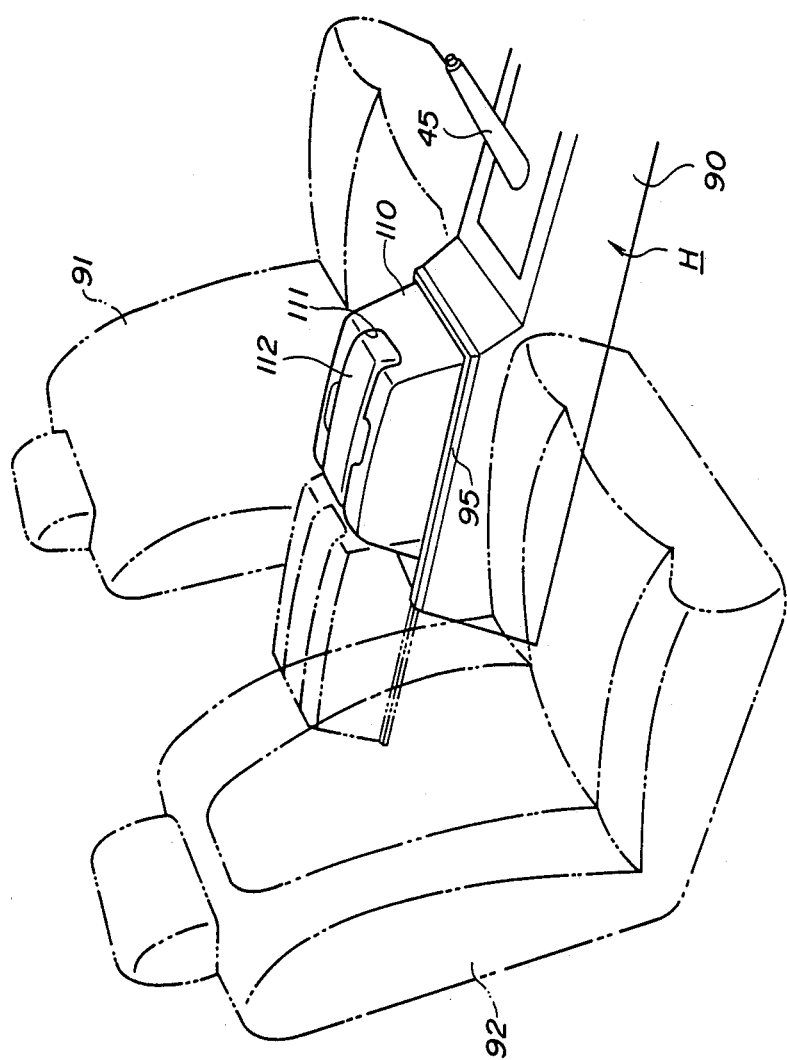
FIG. 27 is a view similar to FIG. 24, showing a modified central console.
Figure 28:
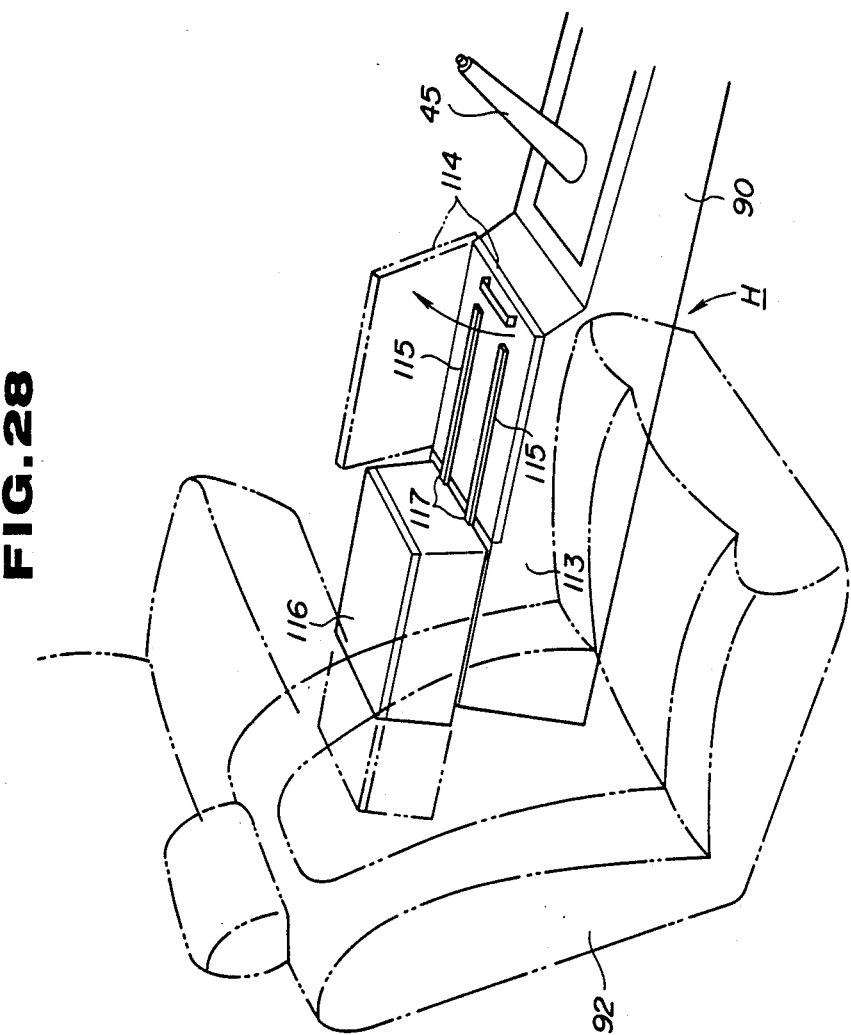
FIG. 28 is a view similar to FIG. 24, illustrating another modified central console.

FIGS. 27 and 28 show modifications of the upper console. In the modification of FIG. 27, an upper console has no upper cover. More specifically, an upper console 110 has a recess 111 defined in its upper surface, and a handset 112 is stored in the recess 111. The other details are the same as those of the embodiment of FIGS. 24 through 26. According to the modification of FIG. 28, an openable/closable cover 114 is pivotally attached to a lefthand side wall 90 of a lower console 113, and two spaced guide rails 115 are mounted on the cover 114. An upper console 116 for accommodating a telephone unit therein includes a bottom wall (not shown) having recesses 117 defined therein in which the guide rails 115 engage, respectively.

Since the upper console is movable on the lower console in each of the above console assemblies, a passenger on the backseat can use the telephone freely. The storage case in the lower console provides a sufficient storage space.

Figure 29:
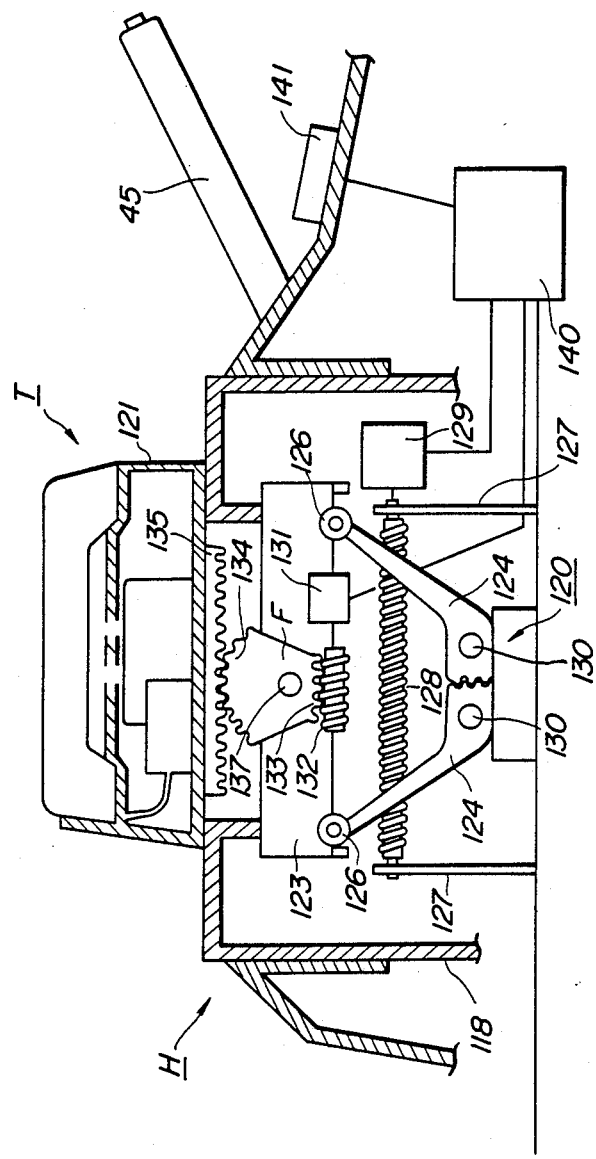
FIG. 29 is an enlarged cross-sectional view of a central console, showing a movable automobile telephone unit.

FIG. 29 shows an embodiment in which a drive device 120 is disposed in a vertically movable lower console 118 for automatically moving a telephone unit T stored in an upper console 121 vertically and back and forth. More specifically, the lower console 118 is disposed in a rear portion of a central console H, and a frame 123 is fixed to the upper panel of the lower console 118. Two arms 124 having worm gears (not shown) formed thereon are swingably mounted on an automobile body, and rollers 126 rollingly engaging the frame 123 are mounted respectively on the distal ends of the arms 124. Support posts 127 are vertically mounted on the automobile body in spaced relation to each other in the fore-and-aft direction of the automobile. A worm 128 is joined to and extends between the support posts 127. The worm 128 are held in mesh with the worm gears of the arms 124. Therefore, when the worm 128 is rotated about its own axis by a motor 129, the arms 124 are moved toward or away from each other, dependent on the direction of rotation of the worm 128, about respective swing pins 130. When the two arms 124 are turned away from each other, the frame 123 and hence the lower console 118 are moved downwardly. When the arms 124 are angularly moved toward each other, the lower console 118 is moved upwardly.

Another motor 131 is mounted on the frame 123 for rotating a worm 132 mounted on the lower surface of the frame 123. The frame 123 has a sector gear F attached to a side thereof and including gear teeth 133 on its lower edge which are held in mesh with the worm 132 and gear teeth 134 on its upper edge which are held in mesh with a rack 135. The rack 135 is attached to the lower surface of a movable base or upper console 121 supported on the upper panel of the lower console 118. When the motor 131 is energized, the worm 132 is rotated about its own axis to turn the sector gear F clockwise or counterclockwise dependent on the direction of rotation of the worm 132 about a pin 137 by which the sector gear F is attached to the frame 123. Upon the swinging movement of the sector gear F, the rack 135 and hence the upper console 121 is moved forwardly or rearwardly on the lower console 118. The drive device 120 includes a controller 140 for controlling the motors 129, 131, the controller 140 being operable by a switch 141 mounted on a front portion of the central console H.

Figure 30:
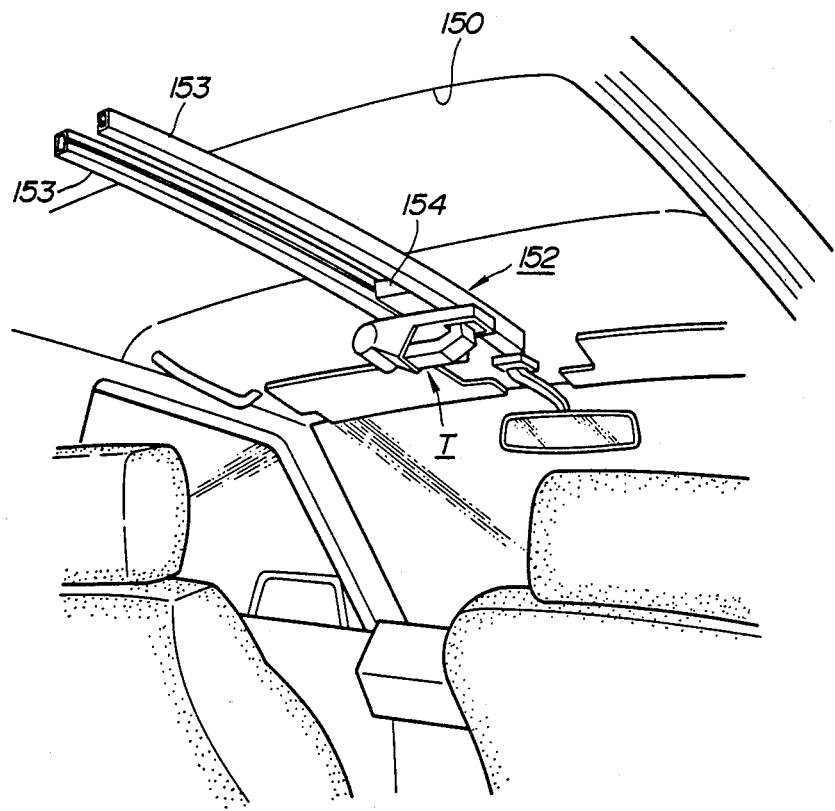
FIG. 30 is a view of the cabin of an automobile, as viewed from the backseat thereof, showing the manner in which a movable automobile telephone unit according to another embodiment of the present invention.

A yet further embodiment of the present invention will be described with reference to FIG. 30. An automobile telephone unit T mounted on a roof 150 above the cabin is movable back and forth by a telephone unit moving mechanism generally denoted at 152. The main telephone unit body and handset of the telephone unit T can thus be moved to positions where it can easily be handled by passengers on the front seat and the backseat. The arrangement of FIG. 30 does not adversely affect effective spaces available in a central console and on a dashboard.

Figure 31:
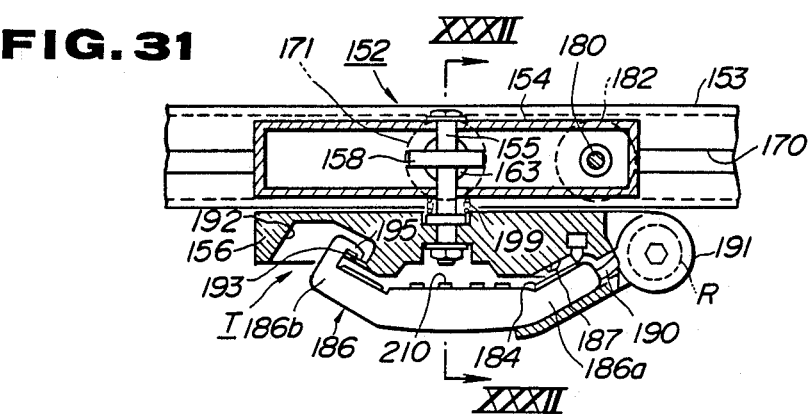
FIG. 31 is an enlarged side elevational view of the automobile telephone unit shown in FIG. 30.
Figure 32:
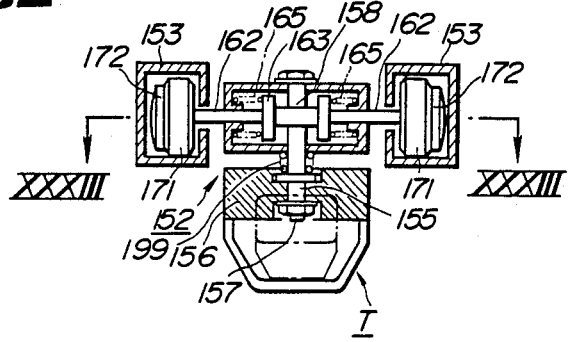
FIG. 32 is a cross-sectional view taken along line XXXII—XXXII of FIG. 31.
Figure 33:
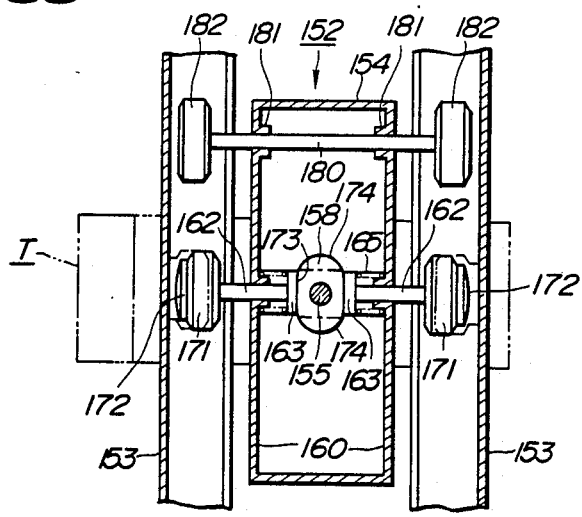
FIG. 33 is a cross-sectional view taken alone line XXXIII—XXXIII of FIG. 32.

FIGS. 31 through 33 show the telephone unit moving mechanism 152 in detail. The telephone unit moving mechanism 152 has two parallel spaced guide rails 153 extending substantially centrally on the roof 150 between positions near the front and rear ends thereof, and a hollow carriage 154 guided by the guide rails 153 for movement in the fore-and-aft direction of the automobile. The carriage 154 has a central vertical support shaft 155, and a main telephone unit body 156 is fixed to the lower end of the support shaft 155 by means of a nut 157. The support shaft 155 is rotatable about its own axis, and so is the main telephone unit body 156 with the support shaft 155. A presser plate 158 is fixedly mounted on the support shaft 155 within the carriage 154. A pair of first roller shafts 162 extends laterally through respective holes 161 defined in lateral side walls 160 of the carriage 154. The roller shafts 162 have small discs 163 respectively on their inner ends which are held against the presser plate 158. Springs 165 are disposed between the small discs 163 and inner surfaces of the side walls 160 of the carriage 154. The outer ends of the first roller shafts 162 extend into the respective guide rails 153 through guide slots 170 defined longitudinally in inner side walls of the guide rails 163, respectively. First rollers 171 are fixed respectively to the outer distal ends of the first roller shafts 162 for rolling movement on the bottom surfaces of the guide rails 153. Frictional members 172 are joined to the outer surfaces of the first rollers 171, respectively.

As shown in FIG. 33, the presser plate 158 has two parallel flat surfaces 173 and two arcuate surfaces 174 joining the flat surfaces 173 to each other. When the flat surfaces 173 are positioned parallel to the side walls 160 of the carriage 154, the telephone unit T has its longitudinal axis lying parallel to the longitudinal axis of the carriage 154 as indicated by the solid lines (first position). When the presser plate 158 is turned 90° against the forces of the springs 165, the telephone unit T is also turned the same angle about the support shaft 155 as indicated by the broken lines to cause the longitudinal axis thereof to extend perpendicularly to the longitudinal axis of the carriage 154 (second position). A second roller shaft 180 is rotatably supported on the carriage 154 forwardly of the first roller shafts 161 by bearings in bosses 181 of the carriage 154. Second rollers 182 are fixed to the opposite ends, respectively, of the second roller shaft 180 for rolling movement on the bottom walls of the guide rails 153.

As illustrated in FIG. 31, the main telephone unit body 156 has a recess 184 defined in one end thereof (in the righthand end as shown) for receiving a receiver 186a of a handset 186 of the telephone unit T. A leaf spring 187 is disposed on one surface of the recess 184 for pressing the inserted receiver 186a against the opposite surface of the recess 184. A connector cord 190 has one end connected to the handset 186 and is wound around a reel R (shown by the broken line in FIG. 31) disposed in a reel case 191. The telephone unit T is energized by unwinding the connector cord 190 about 40 cm from the reel R. The arrangement of the reel is the same as described above, and will not be described in detail here. The main telephone unit body 156 also has a recess 192 defined in the other end thereof and including a finger 193 for engaging a hook 195 on the distal end of a transmitter 186b of the handset 186. A spring 199 is interposed between the carriage 154 and the main telephone unit body 156.

Figure 34:
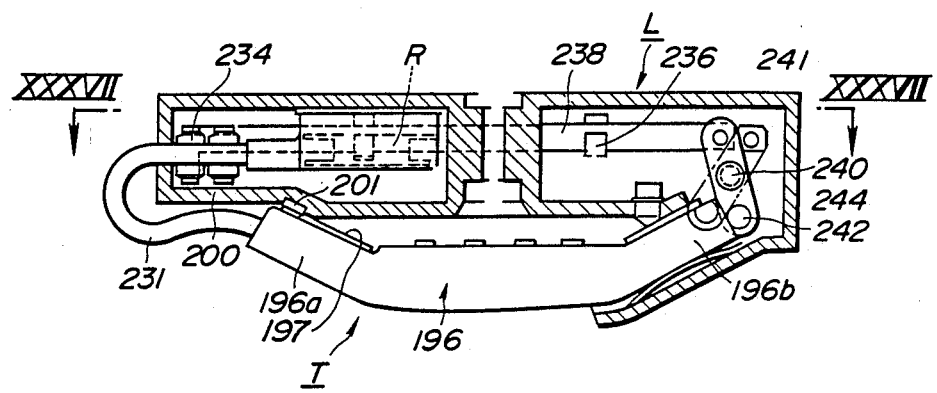
FIG. 34 is a partly sectional side elevational view of a modified automobile telephone unit.

As shown in FIG. 34, a magnet 197 may be attached to a transmitter 196a of a handset 196, and a magnetic member 201 may be attached to one end of a main telephone unit body 200 for magnetically attracting the transmitter 196a to the main telephone unit body 200.

Operation is as follows: As shown in FIGS. 30 and 33, when the telephone unit T is positioned in the second position in perpendicular relation to the guide rails 153, the arcuate surfaces 174 of the presser plate 158 press the small discs 163 on the first roller shafts 161 outwardly against the resiliency of the springs 165 to press the frictional members 172 against the inner surfaces of the outer walls of the guide rails 153. As a result, the carriage 154 and hence the telephone unit T are prevented from moving along the guide rails 153. The hook 195 of the handset 186 is disengaged from the finger 193 of the main telephone unit body 156, and the receiver 186a of the handset 186 is pulled out of the recess 184 to remove the handset 186 from the main telephone unit body 156. The connector cord 190 is unwound from the reel R about 40 cm to turn on the switch 24 (FIG. 2), after which pushbuttons 210 (FIG. 31) are selectively depressed. After the call, the connector cord 190 is rewound on the reel R to automatically turn off the switch, thus de-energizing the telephone unit T.

Figure 35:
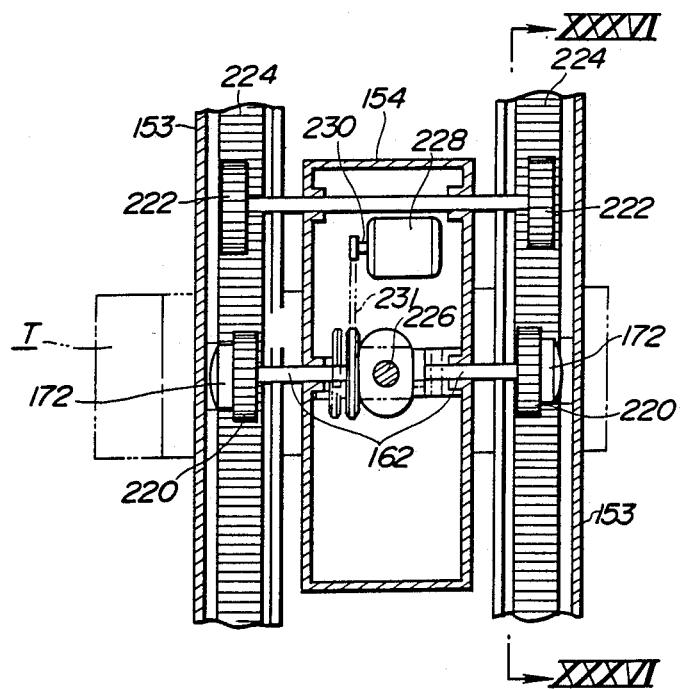
FIG. 35 is sectional plan view of am automobile telephone unit according to another modification.
Figure 36:
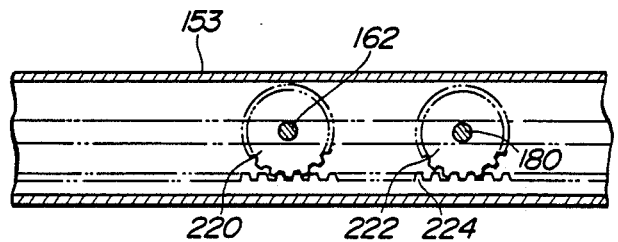
FIG. 36 is a cross-sectional view taken along line XXXVI—XXXVI of FIG. 35.

When a passenger on the backseat wants to place a call through the telephone unit T, the telephone unit T is turned 90° in either direction to angularly move itself from the second position to the first position. The angular movement of the telephone unit T causes the first roller shafts 162 to move inwardly toward each other, releasing the frictional members 172 out of engagement with the inner surfaces of the outer walls of the guide rails 153. Then, the telephone unit T is gripped to move the carriage 154 along the guide rails 153 to a desired rear position. When the telephone unit T has reached the desired position, the telephone unit T is turned 90° again into the second position in which the telephone unit T is fixed to the guide rails 153. The telephone unit T can then be energized by following the same process as described above. FIGS. 35 and 36 show a modified telephone unit moving mechanism. Those reference numerals which are identical to those of the preceding embodiment denote identical or similar components. In the illustrated modification, pinion gears 220 are fixed the outer ends of the first shafts 162, and pinion gears 222 are fixed to the opposite ends of the second shaft 180. Racks 224 are mounted respectively on the bottom walls of the guide rails 153 in mesh with the pinion gears 220, 222. an electric motor 228 is mounted on the carriage 154. A chain 231 is wound around the gear 226 and an output shaft 230 of the motor 228. When a switch (not shown) disposed at a suitable location in the cabin is turned on, the motor 228 is energized to move the carriage 154 and hence the telephone unit T along the guide rails 153 automatically in a forward or rearward direction dependent on the direction of rotation of the motor 228.

Figure 37:
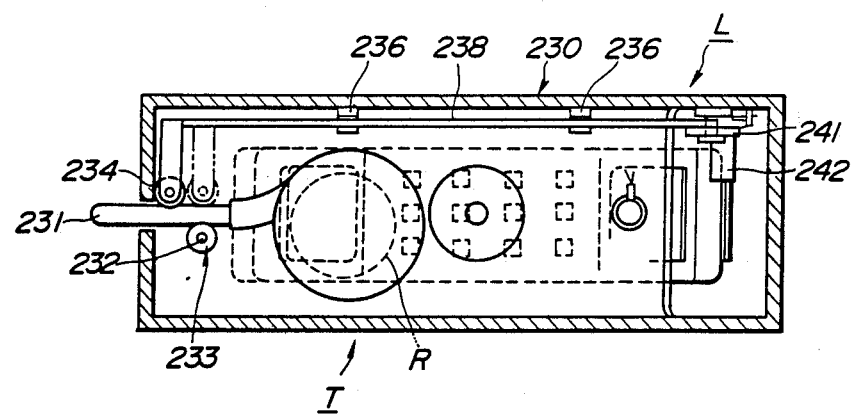
FIG. 37 is a cross-sectional view taken along line XXXVII—XXXVII of FIG. 34.

As shown in FIGS. 34 and 37, a lock mechanism L may be incorporated in the telephone unit T for allowing a connector cord 231 to be unreeled from the reel R, but preventing the connector cord 231 from being rewound, when the handset 196 is removed from a main telephone unit body 230. The lock mechanism L comprises a fixed roller 230 attached to a support shaft 232 secured to the main telephone unit body 230, and a movable roller 234 gripping the connector cord 231 between itself and the fixed roller 233 and rotatably mounted on a support shaft 235. Two hooks or guide members 236 are attached in spaced relation to the inner surface of one side wall of the main telephone unit body 230. A first slidable link 238 is slidably supported on the hooks 236, the support shaft 235 being fixed to one end of the first link 238. The other end of the first link 238 is coupled to one end of a second swingable link 241 which is swingable about a pin 240 and normally urged to rotate clockwise by a spring 244 attached to the main telephone unit body 230. When the handset 196 is attached to the main telephone unit 230, a pin 242 mounted on the other end of the second link 241 is engaged by a transmitter 196b of the handset 196 while the second link 241 is turned counterclockwise by the transmitter 196b. The first link 238 is moved to the left (FIG. 34) to shift the movable roller 234 into a release position located rearwardly of the fixed roller 233 as indicated by the solid line in FIG. 37. The cord 231 is therefore automatically rewound onto the reel R. When the handset 196 is detached from the main telephone unit body 230, the pin 242 on the second link 241 is disengaged from the receiver 196b, allowing the second link 241 to swing clockwise to the broken-line position in FIG. 34 under the bias of the spring 244. The swinging movement of the second link 241 moves the first link 238 to the right and hence moves the movable roller 234 also to the right into a lock position indicated by the broken lines in FIGS. 34 and 37. The connector cord 231 is now prevented from being rewound onto the reel R because it is gripped between the rollers 233, 234. At this time, the connector cord 231 can be unreeled from the reel R by being forcibly pulled by the user.

In each of the movable automobile telephone units according to the illustrated embodiments, the telephone number dialing device including pushbuttons is shown as being incorporated in the handset. However, the telephone number dialing device may be coupled to an operating lever or a rearview mirror angle control device as described above. The main telephone unit body and an associated electric device (not shown) on the automobile may be electrically connected to each other by suitable connecting means which allow their relative movement, such as a known connecting means (not shown) comprising a plurality of parallel rail-type fixed terminals and a plurality of movable terminals slidably engaging the fixed terminals, for example.

Industrial Applicability

The automobile telephone unit according to the present invention offers the following advantages:

(1) Even if the handset is accidentally detached from the main telephone unit body due to vibration of the automobile while it is running on rough terrain, the telephone unit is not energized unless the connector cord connected to the handset is unreeled a certain length from the reel in the main telephone unit body.

(2) The pushbuttons for dialing a telephone number are mounted on the shift lever extending from the central console or the operating lever attached to the steering column cover for allowing the driver to dial the number without looking at the handset. The telephone number display unit is located on the steering column cover or the like which can easily be viewed by the driver. The driver can easily confirm, before actually placing an outgoing call, a telephone number which is displayed on the liquid crystal display of the display unit by pressing pushbuttons.

(3) The telephone number dialing device combined with the rearview mirror angle control device results in a reduction in the number of parts used.

(4) The telephone unit mounted on the central console or the roof of the cabin can easily be used by passengers on the front seat and the backseat for answering a call or placing a call.

We claim:

1. An automobile telephone unit comprising a main body located in a prescribed position in the cabin of an automobile, a telephone number dialing device electrically connected to said main body, a handset electrically connected to said main body through a connector cord and supportable on said main body when not in use, takeup means mounted in said main body and having a reel for winding said connector cord, and switch means coacting with said takeup means for energizing the telephone unit when said connector cord is unreeled a predetermined length from said reel and for de-energizing the telephone unit when said connector cord is rewound on a predetermined length on said reel.

2. An automobile telephone unit according to claim 1, wherein said takeup means further includes a rotary plate connected to said reel through a speed reducer, and said switch means comprises a limit switch attached to said main body and a pin mounted on said rotary plate and engageable with said limit switch.

3. An automobile telephone unit according to claim 1, wherein said telephone number dialing device is attached to said handset.

4. An automobile telephone unit according to claim 1, wherein said automobile has a shift lever disposed substantially centrally on a bottom wall of said cabin, said telephone number dialing device being attached to said shift lever.

5. An automobile telephone unit according to claim 4, wherein said shift lever has a grip on an upper portion thereof, said telephone number dialing device having a pushbutton dialing mechanism attached to an upper surface of said grip.

6. An automobile telephone unit according to claim 5, wherein said telephone number dialing device includes a cover disposed over an upper surface of said dialing mechanism.

7. An automobile telephone unit according to claim 5, further including a telephone number display unit operable with said telephone number dialing device and having a liquid crystal display, said liquid crystal display being disposed on a steering column positioned in a front portion of said cabin.

8. An automobile telephone unit according to claim 1, wherein said automobile has a parking lever disposed substantially centrally on a bottom wall of said cabin, said telephone number dialing device being attached to said parking lever.

9. An automobile telephone unit according to claim 8, further including a telephone number display unit operable with said telephone number dialing device and having a liquid crystal display, said liquid crystal display being disposed on a steering column positioned in said automobile.

10. An automobile telephone unit according to claim 1, wherein said automobile has a steering column disposed in a front portion of said cabin with a rod-like operating lever mounted on the steering column, said telephone number dialing device being attached to said steering column.

11. An automobile telephone unit according to claim 0, further including a telephone number display unit operable with said telephone number dialing device and having a liquid crystal display, said liquid crystal display being disposed on a steering column positioned in said automobile.

12. An automobile telephone unit according to claim wherein said automobile has a rearview mirror angle control device disposed in a prescribed location in said cabin, said telephone number dialing device doubling as said rearview mirror angle control device.

13. An automobile telephone unit according to claim 2, further including a telephone number display unit operable with said telephone number dialing device and having a liquid crystal display, said liquid crystal display being disposed on a steering column positioned in said automobile.

14. An automobile telephone unit according to claim 1, wherein said automobile has a central console disposed substantially centrally on a bottom wall of said cabin, said central console comprising a lower console extending longitudinally on said bottom wall of the cabin and a hollow upper console movable in a fore-and-aft direction on an upper surface of said lower console, said main body and said handset being accommodated in said upper console.

15. An automobile telephone unit according to claim 1, wherein said automobile has a central console disposed substantially centrally on a bottom wall of said cabin, said central console comprising a lower console vertically movable by first drive means and a hollow upper console disposed on an upper surface of said lower console and movable in a fore-and-aft direction on said upper surface of the lower console by second drive means, said main body and said handset being accommodated in said upper console.

16. An automobile telephone unit according to claim 1, further including a telephone unit moving mechanism, said telephone unit moving mechanism comprising guide means extending longitudinally substantially centrally on a roof of said cabin and a carriage movable along said guide means, said main body being attached to a lower surface of said carriage, said handset being detachably mounted on said main body.

17. An automobile telephone unit according to claim 16, wherein said main body is angularly movable about a vertical axis thereof between a first position in which said main body lies parallel to said carriage and a second position in which said main body lies perpendicularly to said carriage, said carriage being immovable with respect to said guide means when said main body is in said second position.

* * * * *